US012520859B2

(12) United States Patent
Gusek et al.

(10) Patent No.: US 12,520,859 B2
(45) Date of Patent: Jan. 13, 2026

(54) TURKEY COLLAGEN HYDROLYSATES AND METHODS OF MAKING

(71) Applicant: Cargill, Incorporated, Wayzata, MN (US)

(72) Inventors: Todd Walter Gusek, Crystal, MN (US); Chathurada Sugeeshvarie Gajadeera, Plymouth, MN (US)

(73) Assignee: Cargill, Incorporated, Wayzata, MN (US)

( * ) Notice: Subject to any disclaimer, the term of this patent is extended or adjusted under 35 U.S.C. 154(b) by 676 days.

(21) Appl. No.: 17/758,694

(22) PCT Filed: Jan. 13, 2021

(86) PCT No.: PCT/US2021/013182
§ 371 (c)(1),
(2) Date: Jul. 12, 2022

(87) PCT Pub. No.: WO2021/146240
PCT Pub. Date: Jul. 22, 2021

(65) Prior Publication Data
US 2023/0056848 A1  Feb. 23, 2023

Related U.S. Application Data

(60) Provisional application No. 62/960,276, filed on Jan. 13, 2020.

(51) Int. Cl.
*A23J 1/10* (2006.01)
*A23J 3/34* (2006.01)

(52) U.S. Cl.
CPC ..................................... *A23J 3/342* (2013.01)

(58) Field of Classification Search
CPC ..... A23J 3/342; A23J 1/10; A23J 3/06; C08H 1/00; C08H 1/06; C08L 89/04; C08L 89/06
See application file for complete search history.

(56) References Cited

U.S. PATENT DOCUMENTS

| | | | |
|---|---|---|---|
| 5,843,920 A | 12/1998 | Weisz | |
| 6,016,862 A | 1/2000 | Herreid | |
| 6,025,327 A | 2/2000 | Alkayali | |
| 6,780,841 B2 | 8/2004 | Ishaq | |
| 7,799,348 B2 | 9/2010 | Ishaq | |
| 7,897,728 B2 | 3/2011 | Dolphin et al. | |
| 8,226,970 B2 | 7/2012 | Ahlers et al. | |
| 8,334,249 B2 | 12/2012 | Belten-Casteel et al. | |
| 8,563,045 B2 | 10/2013 | Ishaq | |
| 8,778,422 B2 | 7/2014 | Oesser | |
| 9,072,724 B2 | 7/2015 | Hausmanns et al. | |
| 10,364,283 B2 | 7/2019 | Oesser et al. | |
| 2006/0275345 A1 | 12/2006 | Butzengeiger et al. | |
| 2008/0003292 A1 | 1/2008 | Ahlers et al. | |
| 2011/0206763 A1 | 8/2011 | Keenan et al. | |
| 2011/0217393 A1 | 9/2011 | Grise | |
| 2013/0345139 A1 | 12/2013 | Oesser et al. | |
| 2014/0255485 A1 | 9/2014 | Frech et al. | |
| 2015/0002622 A1 | 1/2015 | Rondinelli et al. | |
| 2017/0348894 A1 | 12/2017 | Wimmer et al. | |
| 2018/0289032 A1 | 10/2018 | Dick et al. | |
| 2019/0151399 A1 | 5/2019 | Hausmanns et al. | |
| 2019/0262430 A1 | 8/2019 | Oesser et al. | |

FOREIGN PATENT DOCUMENTS

| | | |
|---|---|---|
| CA | 2212649 C | 10/2006 |
| WO | 03/68192 A1 | 8/2003 |
| WO | 2015/002622 A1 | 1/2015 |
| WO | 2018/188902 A1 | 10/2018 |
| WO | 2019/166418 A1 | 9/2019 |

OTHER PUBLICATIONS

Khiari et al. Low molecular weight bioactive peptides derived from the enzymatic hydrolysis of collagen after isoelectric solubilization/precipitation process of turkey by-products, Poultry Science, vol. 93, p. 2347-2362. (Year: 2014).*
Du et al. Preparation and characterization of gelatin from collagen biomass obtained through a pH-shifting process of mechanically separated turkey meat, Poultry Science, vol. 93, p. 989-1000. (Year: 2014).*
Du et al., Physicochemical and functional properties of gelatins extracted from turkey and chicken heads. Poultry Science vol. 92, p. 2463-2474. (Year: 2013).*
Al Hajj et al., Hydrolyzed collagen: Exploring its applications in the food and beverage industries and assessing its impact on human health—A comprehensive review, Heliyon, vol. 10, p. 1-15. (Year: 2024).*
Kristoffersen Kenneth Aase et al., FTIR-based hierarchical modeling for prediction of average molecular weights of protein hydrolysates, Talanta, Elsevier, Amsterdam, NL, vol. 205, Jun. 22, 2019 (Jun. 22, 2019), XP085782478, ISSN: 0039-9140, DOI: 10.1016/J. Talanta 2019.06.084 (retrieved on Jun. 22, 2019) p. 2, paragraph 2. Material and methods—p. 3, right-hand column; figure 3.
Grønlien et al., "Collagen from Turkey (*Meleagris gallopavo*) tendon: A promising sustainable biomaterial for pharmaceutical use" Sustainable Chemistry and Pharmacy, Sep. 1, 2019;13:100166, 12 pages.

* cited by examiner

*Primary Examiner* — Adam Weidner
*Assistant Examiner* — Tiffany M Gough

(57) ABSTRACT

A turkey collagen hydrolysate composition is prepared from turkey collagen sources, wherein the composition has: a protein concentration of from about 80 wt % to 100 wt %; a protein molecular weight distribution wherein from about 80% to 100% of the protein in the turkey collagen hydrolysate composition has a molecular weight of from about 500 to about 15,000 Daltons; a protein solubility of from about 97% to 100% at a pH selected from the group consisting of pH 7.0, pH 3.4, pH 5, and all of pH 7.0, pH 5, and pH 3.4; and a protein amino acid content of 3 to 25 glycine (g/100 g sample), 0.5 to 15 hydroxyproline (g/100 g sample), 1 to 18 proline (g/100 g sample), 0.02 to 4 taurine (g/100 g sample), and 0.05 to 3 tryptophan (g/100 g sample). Methods of preparing turkey collagen hydrolysate compositions are described.

20 Claims, 8 Drawing Sheets

TURKEY COLLAGEN HYDROLYSATES AND METHODS OF MAKING

CROSS REFERENCE TO RELATED APPLICATIONS

This application is a national phase application of PCT/US2021/013182, filed 13 Jan. 2021, entitled TURKEY COLLAGEN HYDROLYSATES AND METHODS OF MAKING which claims the benefit of U.S. Provisional Patent Application No. 62/960,276, filed 13 Jan. 2020, entitled TURKEY COLLAGEN HYDROLYSATES AND METHODS OF MAKING which are hereby incorporated by reference in their entirety.

FIELD

The present invention relates to the field of turkey collagen hydrolysates for use, for example, in food and beverage products.

BACKGROUND

Proteins, whether intrinsic to the food or added to the food, can have a significant effect on the processing and eating experience. Proteins are important nutritional components of diets, and manufacturers and consumers frequently seek out protein ingredients to provide added benefit. Protein hydrolysates provide additional benefits, because the resulting amino acids of the hydrolysates are more easily absorbed by the body than intact proteins, thus, for example, maximizing nutrient delivery to muscle tissues.

Collagen is an important source of proteins, and is a component of, for example, muscles, connective tissues and cartilage in the body. The proteins obtained from collagen have an amino acid content that is different from proteins obtained from muscle or other sources. There are five common types of collagen: Type I is generally obtained from skin, tendon and bone; Type II is generally obtained from cartilage; Type III is generally obtained from reticulate; and Type IV is generally obtained from the epithelium-secreted layer of the basement membrane; and Type V is generally obtained from cell surfaces. Gelatin (also spelled "gelatine") is a material derived from collagen, and is used as a gelling agent in a number of applications.

Specific hydrolyzed collagen and gelatin compositions have been described in the literature. For example, hydrolyzed collagen type II powder compositions, method of preparing the compositions and use of the compositions in treating cartilage defects are described in U.S. Pat. No. 6,025,327. Similarly, a process to make a gelatine hydrolysate, a gelatine hydrolysate, and gelatine compositions including gelatine hydrolysates are described in U.S. Pat. No. 7,897,728.

SUMMARY

It has been found collagen obtained from turkey sources having a unique protein amino acid content that are hydrolyzed in a manner to provide specific molecular weight and solubility characteristics provide significant advantages. Turkeys are unique as a collagen source, because they are large enough to be readily processed to obtain the tendons, ligaments and other collagen containing components from the leg (and particularly the drum) of the turkey, and additionally to obtain the keel of the turkey in a form that can be efficiently processed. The tendons, ligaments and other connective tissues have been found to be rich in Type I and Type III collagen, while the keel has been found to be rich in Type II collagen. Turkey collagen sourced from the tendons and ligaments of the turkey other than from the keel has been found to provide a unique distribution of protein amino acids. Likewise, turkey collagen sourced from the keel has been found to provide a unique distribution of protein amino acids. Because of this amino acid distribution, the turkey collagen hydrolysate compositions as described herein provide relatively high amounts of desirable amino acids that are not available in such quantities in commercially available hydrolyzed collagens sourced from non-turkey collagen sources. In an aspect, the turkey collagen hydrolysate compositions described herein can provide a "complete protein" as defined by the Protein Digestibility Corrected Amino Acid Score (PDCAAS) method.

Additionally, it has been discovered that hydrolyzed collagen sourced from turkey may be more digestible than hydrolyzed collagen sourced from other animal sources.

Moreover, this unique distribution of protein amino acids is provided without the need to augment the content of one or more desired amino acids by addition of a non-endogenous amino acid. Thus, the desired distribution of protein amino acids is obtained by the natural presence of these amino acids, which is a significant benefit to consumers that seek naturally obtained products. Moreover, the ability to provide a desired distribution of protein amino acids from a single species collagen source is advantageous for the manufacturer.

The use of the turkey as a sole source of the collagen is additionally advantageous, because the specialized production and distribution system of turkeys facilitates tracking of the source of every bird, down to the farm from which it is obtained. The consumer is therefore afforded transparency and quality assurance in knowing the source of the turkey collagen hydrolysate composition that they are using.

In an aspect, a turkey collagen hydrolysate composition prepared from turkey collagen sources, wherein the composition has:
  a protein concentration of from about 80 wt % to 100 wt %;
  a protein molecular weight distribution wherein from about 80% to 100% of the protein in the turkey collagen hydrolysate composition has a molecular weight of from about 500 to about 15,000 Daltons;
  a protein solubility of from about 97% to 100% at a pH selected from the group consisting of pH 7.0, pH 3.4, pH 5, and all of pH 7.0, pH 5, and pH 3.4; and
  a protein amino acid content of
    3 to 25 glycine (g/100 g sample),
    0.5 to 15 hydroxyproline (g/100 g sample),
    1 to 18 proline (g/100 g sample),
    0.02 to 4 taurine (g/100 g sample), and
    0.05 to 3 tryptophan (g/100 g sample).

In an aspect, a method of preparing the turkey collagen hydrolysate compositions as described herein comprises
  a) providing a gelatin obtained from a turkey;
  b) adding an enzyme to a gelatin suspension containing the gelatin at a ratio of from about 1:100 to about 1:20 by weight of enzyme to collagen;
  c) controlling the pH and temperature of the gelatin suspension to hydrolyze the collagen to provide the turkey collagen hydrolysate composition; and
  d) drying the turkey collagen peptide composition to provide a turkey collagen hydrolysate composition having a moisture content about 10 wt % or less.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION

Figure 1:
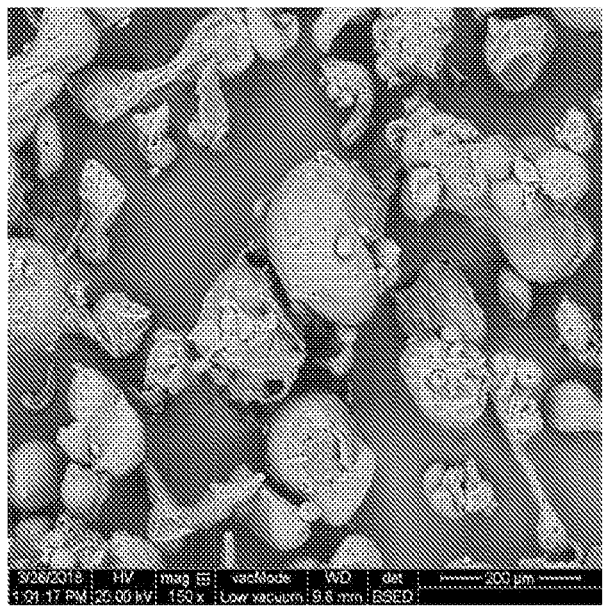
FIG. 1 is a photograph of an SEM of a prior art, commercially available bovine hydrolysate composition.

The aspects of the present invention described below are not intended to be exhaustive or to limit the invention to the precise forms disclosed in the following detailed description. Rather a purpose of the aspects chosen and described is by way of illustration or example, so that the appreciation and understanding by others skilled in the art of the general principles and practices of the present invention can be facilitated.

For purposes of the present disclosure, the term "protein" when describing protein concentration, protein molecular weight distributions, protein solubility, and protein amino acid content is defined as native protein structures or denatured protein structures or fragments thereof, such as hydrolysates and peptides.

For purposes of the present disclosure, "Collagen hydrolysate" or "Gelatin hydrolysate" or "hydrolysate" refers to a collagen or gelatin composition that has undergone limited hydrolysis under controlled conditions.

For purposes of the present disclosure, protein content is determined by measuring nitrogen content according to AOAC 992.15 nitrogen combustion method, and using a conversion factor of 6.25 to calculate protein content.

For purposes of the present disclosure, protein molecular weight distribution is determined by size exclusion HPLC, wherein the proteins are eluted with a 20 mM sodium phosphate and 280 mM sodium chloride solution in an Agilent 1260 HPLC system with GE Healthcare Superdex 30 10/300 column.

For purposes of the present disclosure, "protein solubility" refers to the concentration of the protein that is present in the liquid phase relative to the amount of protein that is present in the liquid and solid phase at equilibrium. Protein solubility can be reported as a percentage and is determined by measuring sample content in the supernatant after applying centrifugal force to a solution prepared at specific protein content, pH and salt concentration, relative to the total protein in the solution prior to centrifugation.

For purposes of the present disclosure, protein amino acid content is determined by amino acid analysis as directed in AOAC Official Method 982.30 E(a, b, c), chp. 45.3.05, 2006. The analysis for tryptophan is carried out by alkaline hydrolysis as directed in AOAC Official Method 988.15, chp. 45.4.04, 2006. The sample to be tested is prepared by pre-drying the sample to a moisture content of no more than 10 wt %. For determining whether any given sample's protein amino acid content is within the ranges described herein, the moisture content of the sample is measured and the experimentally determined protein amino acid content of the sample is normalized to a sample moisture content of 10 wt %.

As noted above, a turkey collagen hydrolysate composition is prepared from turkey collagen sources, wherein the composition has:

a protein concentration of from about 80 wt % to 100 wt %;

a protein molecular weight distribution wherein from about 80% to 100% of the protein in the turkey collagen hydrolysate composition has a molecular weight of from about 500 to about 15,000 Daltons;

a protein solubility of from about 97% to 100% at a pH selected from the group consisting of pH 7.0, pH 3.4, pH 5, and all of pH 7.0, pH 5, and pH 3.4; and a protein amino acid content of
3 to 25 glycine (g/100 g sample),
0.5 to 15 hydroxyproline (g/100 g sample),
1 to 18 proline (g/100 g sample),
0.02 to 4 taurine (g/100 g sample), and
0.05 to 3 tryptophan (g/100 g sample). In an aspect, the taurine content is 0.05 to 4 taurine (g/100 g sample).

In an aspect, the turkey collagen hydrolysate composition has an amino acid content of
4 to 21 glycine (g/100 g sample),
0.5 to 12 hydroxyproline (g/100 g sample),
1 to 15 proline (g/100 g sample),
0.1 to 2 taurine (g/100 g sample), and
0.05 to 3 tryptophan (g/100 g sample).

In an aspect, the turkey collagen hydrolysate composition has an amino acid content of
3 to 25 glycine (g/100 g sample),
0.1 to 6 histidine (g/100 g sample),
0.5 to 15 hydroxyproline (g/100 g sample),
0.5 to 7 isoleucine (g/100 g sample),
1 to 9 leucine (g/100 g sample),
1 to 9 lysine (g/100 g sample),
0.5 to 5 methionine (g/100 g sample),
0.5 to 5 phenylalanine (g/100 g sample),
1 to 18 proline (g/100 g sample),
0.05 to 4 taurine (g/100 g sample),
0.5 to 6 threonine (g/100 g sample),
0.05 to 3 tryptophan (g/100 g sample), and
0.5 to 7 valine (g/100 g sample).

In an aspect, the turkey collagen hydrolysate composition has an amino acid content of
2 to 11 alanine (g/100 g sample),
3 to 12 arginine (g/100 g sample)
2 to 10 aspartic acid (g/100 g sample),
0.1 to 3 cysteine (g/100 g sample),
5 to 14 glutamic acid (g/100 g sample),
3 to 25 glycine (g/100 g sample), 0.1 to 6 histidine (g/100 g sample), and
0.3 to 10 hydroxylysine (g/100 g sample),
0.5 to 15 hydroxyproline (g/100 g sample),
0.5 to 7 isoleucine (g/100 g sample),
1 to 9 leucine (g/100 g sample),
1 to 9 lysine (g/100 g sample),
0.5 to 5 methionine (g/100 g sample),
0.5 to 5 phenylalanine (g/100 g sample),
1 to 18 proline (g/100 g sample),
0.5 to 6 serine (g/100 g sample),
0.2 to 4 taurine (g/100 g sample),
0.5 to 6 threonine (g/100 g sample),
0.05 to 3 tryptophan (g/100 g sample),
0.5 to 6 tyrosine (g/100 g sample), and
0.5 to 7 valine (g/100 g sample).

In an aspect, the turkey collagen hydrolysate composition sourced from collagen containing components of turkey has an amino acid content as follows:
11 to 18 glycine (g/100 g sample),
4 to 10 hydroxyproline (g/100 g sample),
4 to 10 proline (g/100 g sample),
0.1 to 1 taurine (g/100 g sample), and
0.05 to 3 tryptophan (g/100 g sample).

In an aspect, the above turkey collagen hydrolysate composition comprises protein and/or peptides sourced from tendons, ligaments and other collagen containing components from the leg.

In an aspect, the turkey collagen hydrolysate composition sourced from collagen containing components of turkey has an amino acid content as follows:
11 to 18 glycine (g/100 g sample),
0.1 to 3 histidine (g/100 g sample),
4 to 10 hydroxyproline (g/100 g sample),
0.5 to 4 isoleucine (g/100 g sample),
1 to 6 leucine (g/100 g sample),
1 to 6 lysine (g/100 g sample),
0.5 to 4 methionine (g/100 g sample),
0.5 to 4 phenylalanine (g/100 g sample),
4 to 10 proline (g/100 g sample),
0.1 to 1 taurine (g/100 g sample),
1 to 4 threonine (g/100 g sample),
0.05 to 1 tryptophan (g/100 g sample), and
0.5 to 4 valine (g/100 g sample).

In an aspect, the above turkey collagen hydrolysate composition comprises protein and/or peptides sourced from tendons, ligaments and other collagen containing components from the leg.

In an aspect, the turkey collagen hydrolysate composition sourced from collagen containing components of turkey has an amino acid content as follows:
3 to 10 alanine (g/100 g sample),
3 to 9 arginine (g/100 g sample)
3 to 8 aspartic acid (g/100 g sample),
0.1 to 1 cysteine (g/100 g sample),
5 to 11 glutamic acid (g/100 g sample),
11 to 18 glycine (g/100 g sample),
0.1 to 3 histidine (g/100 g sample), and
0.1 to 3 hydroxylysine (g/100 g sample),
4 to 10 hydroxyproline (g/100 g sample),
0.5 to 4 isoleucine (g/100 g sample),
1 to 6 leucine (g/100 g sample),
1 to 6 lysine (g/100 g sample),
0.5 to 4 methionine (g/100 g sample),
0.5 to 4 phenylalanine (g/100 g sample),
4 to 10 proline (g/100 g sample),
1 to 4 serine (g/100 g sample),
0.1 to 1 taurine (g/100 g sample),
1 to 4 threonine (g/100 g sample),
0.05 to 1 tryptophan (g/100 g sample),
0.5 to 4 tyrosine (g/100 g sample), and
0.5 to 4 valine (g/100 g sample).

In an aspect, the above turkey collagen hydrolysate composition comprises protein and/or peptides sourced from tendons, ligaments and other collagen containing components from the leg.

In an aspect, the turkey collagen hydrolysate composition sourced from collagen containing components of turkey has an amino acid content as follows:
4 to 17 glycine (g/100 g sample),
0.5 to 9 hydroxyproline (g/100 g sample),
1 to 11 proline (g/100 g sample),
0.05 to 2 taurine (g/100 g sample), and
0.05 to 3 tryptophan (g/100 g sample).

In an aspect, the above turkey collagen hydrolysate composition comprises protein and/or peptides sourced from collagen containing components from the keel.

In an aspect, the turkey collagen hydrolysate composition sourced from collagen containing components of turkey has an amino acid content as follows:
4 to 17 glycine (g/100 g sample),
0.5 to 6 histidine (g/100 g sample),
0.5 to 9 hydroxyproline (g/100 g sample),
0.5 to 7 isoleucine (g/100 g sample),
1 to 9 leucine (g/100 g sample),
1 to 9 lysine (g/100 g sample),
0.1 to 5 methionine (g/100 g sample),
0.5 to 5 phenylalanine (g/100 g sample),
1 to 11 proline (g/100 g sample),
0.05 to 2 taurine (g/100 g sample),
0.5 to 6 threonine (g/100 g sample),
0.05 to 3 tryptophan (g/100 g sample), and
0.5 to 7 valine (g/100 g sample).

In an aspect, the above turkey collagen hydrolysate composition comprises protein and/or peptides sourced from collagen containing components from the keel.

In an aspect, the turkey collagen hydrolysate composition sourced from collagen containing components of turkey has an amino acid content as follows:
2 to 10 alanine (g/100 g sample),
3 to 10 arginine (g/100 g sample)
2 to 10 aspartic acid (g/100 g sample),
0.1 to 2 cysteine (g/100 g sample),
5 to 14 glutamic acid (g/100 g sample),
4 to 18 glycine (g/100 g sample),
0.5 to 6 histidine (g/100 g sample), and
0.1 to 3 hydroxylysine (g/100 g sample),
0.5 to 9 hydroxyproline (g/100 g sample),
0.5 to 7 isoleucine (g/100 g sample),
1 to 9 leucine (g/100 g sample),
1 to 9 lysine (g/100 g sample),
0.1 to 5 methionine (g/100 g sample),
0.5 to 5 phenylalanine (g/100 g sample),
1 to 11 proline (g/100 g sample),
0.5 to 5 serine (g/100 g sample),
0.05 to 2 taurine (g/100 g sample),
0.5 to 6 threonine (g/100 g sample),
0.05 to 3 tryptophan (g/100 g sample),
0.5 to 6 tyrosine (g/100 g sample), and
0.5 to 7 valine (g/100 g sample).

In an aspect, the above turkey collagen hydrolysate composition comprises protein and/or peptides sourced from collagen containing components from the keel.

In an aspect, the turkey collagen hydrolysate composition sourced from collagen containing components of turkey has an amino acid content as follows:
- 4 to 17 glycine (g/100 g sample),
- 0.5 to 9 hydroxyproline (g/100 g sample),
- 1 to 11 proline (g/100 g sample),
- 0.02 to 2 taurine (g/100 g sample), and
- 0.05 to 3 tryptophan (g/100 g sample).

In an aspect, the above turkey collagen hydrolysate composition comprises protein and/or peptides sourced from collagen containing components from skin and bone.

In an aspect, the turkey collagen hydrolysate composition sourced from collagen containing components of turkey has an amino acid content as follows:
- 4 to 17 glycine (g/100 g sample),
- 0.2 to 6 histidine (g/100 g sample),
- 0.5 to 9 hydroxyproline (g/100 g sample),
- 0.4 to 7 isoleucine (g/100 g sample),
- 1 to 9 leucine (g/100 g sample),
- 1 to 9 lysine (g/100 g sample),
- 0.1 to 5 methionine (g/100 g sample),
- 0.5 to 5 phenylalanine (g/100 g sample),
- 1 to 11 proline (g/100 g sample),
- 0.02 to 2 taurine (g/100 g sample),
- 0.5 to 6 threonine (g/100 g sample),
- 0.05 to 3 tryptophan (g/100 g sample), and
- 0.5 to 7 valine (g/100 g sample).

In an aspect, the above turkey collagen hydrolysate composition comprises protein and/or peptides sourced from collagen containing components from skin and bone.

In an aspect, the turkey collagen hydrolysate composition sourced from collagen containing components of turkey has an amino acid content as follows:
- 2 to 10 alanine (g/100 g sample),
- 1 to 10 arginine (g/100 g sample)
- 1 to 10 aspartic acid (g/100 g sample),
- 0.1 to 2 cysteine (g/100 g sample),
- 2 to 14 glutamic acid (g/100 g sample),
- 4 to 18 glycine (g/100 g sample),
- 0.2 to 6 histidine (g/100 g sample), and
- 0.1 to 3 hydroxylysine (g/100 g sample),
- 0.5 to 9 hydroxyproline (g/100 g sample),
- 0.4 to 7 isoleucine (g/100 g sample),
- 1 to 9 leucine (g/100 g sample),
- 1 to 9 lysine (g/100 g sample),
- 0.1 to 5 methionine (g/100 g sample),
- 0.5 to 5 phenylalanine (g/100 g sample),
- 1 to 11 proline (g/100 g sample),
- 0.5 to 5 serine (g/100 g sample),
- 0.02 to 2 taurine (g/100 g sample),
- 0.5 to 6 threonine (g/100 g sample),
- 0.05 to 3 tryptophan (g/100 g sample),
- 0.3 to 6 tyrosine (g/100 g sample), and
- 0.5 to 7 valine (g/100 g sample).

In an aspect, the above turkey collagen hydrolysate composition comprises protein and/or peptides sourced from collagen containing components from skin and bone.

In an aspect, the turkey collagen hydrolysate composition has a protein concentration of at least about 83 wt %. In an aspect, the turkey collagen hydrolysate composition has a protein concentration of at least about 85 wt %. In an aspect, the turkey collagen hydrolysate composition has a protein concentration of at least about 87 wt %. In an aspect, the turkey collagen hydrolysate composition has a protein concentration of from about 80 wt % to about 98%. In an aspect, the turkey collagen hydrolysate composition has a protein concentration of from about 80 wt % to about 95%. In an aspect, the turkey collagen hydrolysate composition has a protein concentration of from about 80 wt % to about 90%. In an aspect, the turkey collagen hydrolysate composition has a protein concentration of from about 85 wt % to about 98%. In an aspect, the turkey collagen hydrolysate composition has a protein concentration of from about 87 wt % to about 98%. In an aspect, the turkey collagen hydrolysate composition has a protein concentration of from about 90 wt % to about 98%.

The turkey collagen hydrolysate compositions as described herein are highly soluble, at a pH selected from the group consisting of pH 7.0, pH 3.4, pH 5, and all of pH 7.0, pH 5, and pH 3.4. Thus, in an aspect, the turkey collagen hydrolysate composition has a protein solubility of from about 98% to 100% at a pH of 7; or the turkey collagen hydrolysate composition has a protein solubility of from about 98% to 100% at a pH of 3.4; or the turkey collagen hydrolysate composition has a protein solubility of from about 98% to 100% at a pH of 5; or the turkey collagen hydrolysate composition has a protein solubility of from about 98% to 100% at a pH of 3.4, 5 and 7. In an aspect, the turkey collagen hydrolysate composition has a protein solubility of from about 99% to 100% at a pH of 7; or the turkey collagen hydrolysate composition has a protein solubility of from about 99% to 100% at a pH of 3.4; or the turkey collagen hydrolysate composition has a protein solubility of from about 99% to 100% at a pH of 5; or the turkey collagen hydrolysate composition has a protein solubility of from about 99% to 100% at a pH of 3.4, 5 and 7.

This protein solubility is particularly advantageous in the incorporation of the turkey collagen hydrolysate composition in various food or beverage compositions, without sensitivity to the pH of the formulation. In other words, a given turkey collagen hydrolysate composition will have essentially the same protein solubility characteristics regardless of whether the pH of the composition is at any pH from 3.4 to 9 when the solubility is measured. For purposes of convenience, testing of the protein solubility of the turkey collagen hydrolysate composition at pH 3.4, 5 and 7 is an indication of the sensitivity of the solubility characteristics of the proteins at relevant pH values. Compositions as described herein exhibit excellent protein solubility characteristics at pH values between 3.4 and 7, for example, at 5.

In an aspect, the turkey collagen hydrolysate composition has a degree of hydrolysis of from about 40 to about 80. In an aspect, the turkey collagen hydrolysate composition has a degree of hydrolysis of from about 45 to about 75. In an aspect, the turkey collagen hydrolysate composition has a degree of hydrolysis of from about 50 to about 70. Degree of hydrolysis (DH) refers to the proportion of cleaved peptide bonds in the hydrolysate. The degree of hydrolysis is determined using OPA method described in Nielsen, Petersen & Dambmann, 2001, Improved Method for Determining Food Protein Degree of Hydrolysis, Journal of Food Science, 642-646. In this method, collagen hydrolysate (0.01 g) is mixed with 10 ml water for an hour, and preparation of the OPA reagent, serine standard and testing of the samples are carried out as described in Nielsen, et al. A BCA assay was carried out to determine the protein concentration following the instructions of Pierce BCA Protein Assay Kit (Thermo Scientific, #23227).

In an aspect, the turkey collagen hydrolysate composition is dried and milled to provide a favorable small average particle size and small particle distribution. While not being bound by theory, it is believed that the turkey collagen hydrolysate compositions as described herein exhibit particularly favorable absorption and amino acid delivery characteristics when formatted in a small particle size. To this end, in an aspect of the present invention, the present turkey collagen hydrolysate composition has an average particle size of from about 1 to about 60 micrometers. In an aspect, the turkey collagen hydrolysate composition has an particle size distribution wherein from about 50 to 80 percent by weight of the particles have an average particle size of from about 1 to about 20 micrometers, and from about 30 to 50 percent by weight of the particles have an average particle size of from about 80 to about 150 micrometers.

Figure 2:
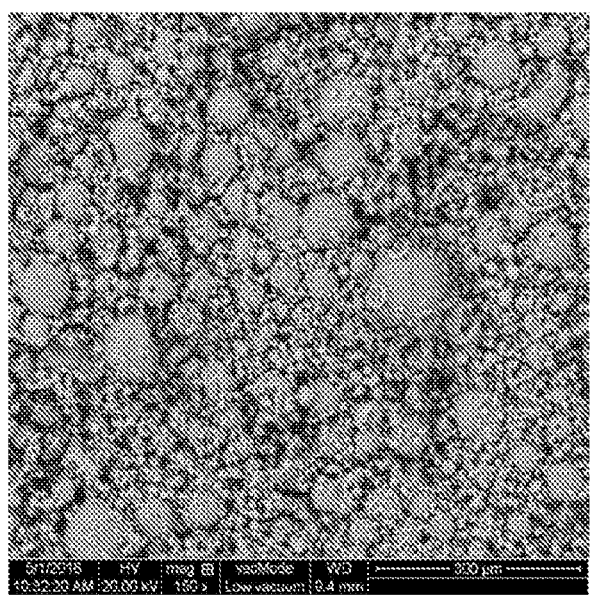
FIG. 2 is a photograph of an SEM of a turkey hydrolysate composition as described herein.

FIG. 1 is a photograph of an SEM of a prior art, commercially available bovine hydrolysate composition. As can be seen, the particles of this composition are relatively uniform in size, wherein most particles have a diameter of at least about 60 micrometers. In contrast, the photograph of an SEM of a turkey hydrolysate composition as described herein shown in FIG. 2 shows a very different particle size distribution. In an aspect, the particles of this composition have an average particle size of from about 1 to about 60 micrometers in diameter. Moreover, the particles have a bimodal size distribution, wherein very large amount of the particles have a very small average diameter particle size diameter, e.g. of from about 1 to about 20 micrometers, and a significant portion of the particles have a larger diameter, e.g. an average diameter of from about 80 to about 150 micrometers. While not being bound by theory, it is believed that this particle size distribution facilitates availability and absorption of the hydrolyzed turkey collagen by the body.

As noted above, the turkey collagen hydrolysates advantageously have a protein molecular weight distribution wherein from about 80% to 100% of the protein in the turkey collagen hydrolysate composition has a molecular weight of from about 500 to about 15,000 Daltons. Turkey collagen hydrolysates comprising large amounts of protein compounds having low molecular weights (e.g. below 500 Daltons) may exhibit a bitter taste. Additionally, turkey collagen hydrolysates comprising large amounts of protein compounds having higher molecular weights (e.g. above 15,000 Daltons) may be less bioavailable than turkey collagen hydrolysates that do not comprise large amounts of protein compounds having higher molecular weights.

In an aspect, from about 25% to 60% of the protein in the turkey collagen hydrolysate composition has a molecular weight of from about 500 to about 5000 Daltons. In an aspect, from about 30% to 50% of the protein in the turkey collagen hydrolysate composition has a molecular weight of from about 500 to about 5000 Daltons.

In an aspect, the turkey collagen hydrolysates have less than 20% by weight of protein compounds having molecular weights of less than 500 Daltons. In an aspect, the turkey collagen hydrolysates have less than 10% by weight of protein compounds having molecular weights of less than 500 Daltons. In an aspect, the turkey collagen hydrolysates have less than 20% by weight of protein compounds having molecular weights of less than 1000 Daltons. In an aspect, the turkey collagen hydrolysates have less than 10% by weight of protein compounds having molecular weights of less than 1000 Daltons. In an aspect, the turkey collagen hydrolysates have less than 20% by weight of protein compounds having molecular weights of less than 1500 Daltons. In an aspect, the turkey collagen hydrolysates have less than 10% by weight of protein compounds having molecular weights of less than 1500 Daltons.

In an aspect, the turkey collagen hydrolysates have less than 20% by weight of protein compounds having molecular weights of greater than 40,000 Daltons. In an aspect, the turkey collagen hydrolysates have less than 10% by weight of protein compounds having molecular weights of greater than 40,000 Daltons.

In an aspect, the turkey collagen hydrolysates have less than 20% by weight of protein compounds having molecular weights of greater than 30,000 Daltons. In an aspect, the turkey collagen hydrolysates have less than 10% by weight of protein compounds having molecular weights of greater than 30,000 Daltons.

In an aspect, the turkey collagen hydrolysates have less than 20% by weight of protein compounds having molecular weights of greater than 20,000 Daltons. In an aspect, the turkey collagen hydrolysates have less than 10% by weight of protein compounds having molecular weights of greater than 20,000 Daltons.

In an aspect, the turkey collagen hydrolysates have less than 20% by weight of protein compounds having molecular weights of greater than 10,000 Daltons. In an aspect, the turkey collagen hydrolysates have less than 10% by weight of protein compounds having molecular weights of greater than 10,000 Daltons.

In an aspect, the turkey collagen hydrolysate composition has a fat content of about 0.5 wt % or less. In an aspect, the turkey collagen hydrolysate composition has a fat content of about 0.1 wt % or less.

In an aspect, the turkey collagen hydrolysate composition has an ash content of about 4% or less, or of about 3% or less. In an aspect, the turkey collagen hydrolysate composition has an ash content of about 2% or less. In an aspect, the turkey collagen hydrolysate composition has an ash content of about 1% or less.

In an aspect, the turkey collagen hydrolysate composition has a moisture content about 10 wt % or less; or wherein the composition has a moisture content about 8 wt % or less; or wherein the composition has a moisture content about 5 wt % or less.

In an aspect, the turkey collagen hydrolysate composition comprises type I and type III collagen. In an aspect, the composition comprises type II collagen. In an aspect, the composition comprises type IV collagen. In an aspect, the composition comprises type V collagen. In an aspect, the turkey collagen hydrolysate composition comprises type I, type II, and type III collagen. In an aspect, the turkey collagen hydrolysate composition comprises type I, type II, type III and type V collagen.

The turkey collagen hydrolysate compositions as described herein may be prepared by
   a) providing a gelatin obtained from a turkey;
   b) adding an enzyme to a gelatin suspension containing the gelatin at a ratio of from about 1:20 to about 1:200 by weight of enzyme to gelatin;
   c) controlling the pH and temperature of the gelatin suspension to hydrolyze the gelatin to provide the turkey collagen hydrolysate composition; and
   d) drying the turkey collagen peptide composition to provide a turkey collagen hydrolysate composition having a moisture content about 10 wt % or less.

In an aspect, an enzyme is added to the gelatin suspension containing the gelatin composition at a ratio of from about 1:20 to about 1:200 by weight of enzyme to gelatin. In an aspect, an enzyme is added to the gelatin suspension containing the gelatin composition at a ratio of from about 1:50 to about 1:200 by weight of enzyme to gelatin. In an aspect, the enzyme can be added at a ratio from about 1:20 to about 1:55 (by weight) of enzyme to gelatin. In an aspect, the enzyme can be added at a ratio from about 1:45 to about 1:55 (by weight) of enzyme to gelatin. In an aspect, the enzyme can be added at a ratio from about 1:20 to about 1:30 (by weight) of enzyme to gelatin. In an aspect, the enzyme can be added at a ratio from about 1:25 to about 1:50 (by weight) of enzyme to gelatin. In an aspect, the ratio of enzyme to gelatin is about 1:50. In an aspect, the ratio of enzyme to gelatin is about 1:37.5. In an aspect, the ratio of enzyme to gelatin is about 1:25. In an aspect, the ratio of enzyme to gelatin is from about 1:75 to 1:150. In an aspect, the ratio of enzyme to gelatin is about 1:100.

In an aspect, the pH of the gelatin suspension is adjusted and/or maintained at a desired level prior to addition of the enzyme. In an aspect, the pH of the gelatin suspension is adjusted and/or maintained at from about 2.0 to about 5.0 prior to addition of the enzyme as desired for the particular enzyme being used. In an aspect, the pH of the gelatin suspension is adjusted and/or maintained at from about 2.0 to about 4.0 prior to addition of the enzyme as desired for the particular enzyme being used. In an aspect, the pH of the gelatin suspension is adjusted and/or maintained at from about 5.0 to about 8.0 prior to addition of the enzyme as desired for the particular enzyme being used. In an aspect, the pH of the gelatin suspension is adjusted and/or maintained at from about 5.0 to about 6.0 prior to addition of the enzyme as desired for the particular enzyme being used.

The term "enzyme" means a composition having an active enzyme product. One skilled in the art will appreciate enzyme activity and inclusion level can be varied within an enzyme product. In an aspect, the enzyme is a protease. In an aspect, the protease enzyme is obtained from a fungus. In an aspect, the protease is obtained from the fungus *Aspergillus oryzae*. In an example, the fungal enzyme can be Protease M "Amano" SD from Amano Enzyme Inc. While not being bound by theory, it is believed that fungal enzymes in particular when used in the hydrolysis process as described herein targets specific sites on the protein resulting in the release of hydrophilic peptides that are not perceived as bitter, and may when used under the conditions as described herein minimize protein off-flavor.

In an aspect, the enzyme comprises an endoprotease; or wherein the enzyme comprises an endoprotease selected from alcalase, trypsin, chymotrypsin, elastase, thermolysin, pepsin, glutamyl endoprotease, neprilysin, and mixtures thereof. In an aspect, the enzyme comprises an exoprotease; or wherein the enzyme comprises an exoprotease selected from carboxypeptidases, aminopeptidases, dipeptidases, and mixtures thereof.

In an aspect, the gelatin suspension is first hydrolyzed by a first enzyme selected from at least one endoprotease, and then hydrolyzed by a second enzyme selected from at least one exoprotease.

In an aspect, a first enzyme is added to the gelatin suspension containing the gelatin composition at a ratio of from about 1:20 to about 1:200 by weight of enzyme to gelatin, and the pH and temperature of the gelatin solution or suspension containing the enzyme is controlled for a time sufficient to hydrolyze the gelatin to the desired degree of hydrolysis. Then a second enzyme is added to the gelatin suspension containing the gelatin composition at a ratio of from about 1:20 to about 1:200 by weight of enzyme to gelatin, and the pH and temperature of the gelatin solution or suspension containing the enzyme is controlled for a time sufficient to hydrolyze the gelatin to the desired degree of hydrolysis.

In an aspect, the first enzyme is added to the gelatin suspension containing the gelatin composition at a ratio of from about 1:50 to about 1:200 by weight of enzyme to gelatin. In an aspect, the first enzyme can be added at a ratio from about 1:20 to about 1:55 (by weight) of enzyme to gelatin. In an aspect, the first enzyme can be added at a ratio from about 1:45 to about 1:55 (by weight) of enzyme to gelatin. In an aspect, the first enzyme can be added at a ratio from about 1:20 to about 1:30 (by weight) of enzyme to gelatin. In an aspect, the first enzyme can be added at a ratio from about 1:25 to about 1:50 (by weight) of enzyme to gelatin. In an aspect, the ratio of the first enzyme to gelatin is about 1:50. In an aspect, the ratio of the first enzyme to gelatin is about 1:37.5. In an aspect, the ratio of the first enzyme to gelatin is about 1:25. In an aspect, the ratio of the first enzyme to gelatin is from about 1:75 to 1:150. In an aspect, the ratio of the first enzyme to gelatin is about 1:100.

In an aspect, the second enzyme is added to the gelatin suspension containing the gelatin composition at a ratio of from about 1:50 to about 1:200 by weight of enzyme to gelatin. In an aspect, the second enzyme can be added at a ratio from about 1:20 to about 1:55 (by weight) of enzyme to gelatin. In an aspect, the second enzyme can be added at a ratio from about 1:45 to about 1:55 (by weight) of enzyme to gelatin. In an aspect, the second enzyme can be added at a ratio from about 1:20 to about 1:30 (by weight) of enzyme to gelatin. In an aspect, the second enzyme can be added at a ratio from about 1:25 to about 1:50 (by weight) of enzyme to gelatin. In an aspect, the ratio of the second enzyme to gelatin is about 1:50. In an aspect, the ratio of the second enzyme to gelatin is about 1:37.5. In an aspect, the ratio of the second enzyme to gelatin is about 1:25. In an aspect, the ratio of the second enzyme to gelatin is from about 1:75 to 1:150. In an aspect, the ratio of the second enzyme to gelatin is about 1:100.

In an aspect, the pH and temperature of the gelatin solution or suspension containing the enzyme is controlled for a time sufficient to hydrolyze the gelatin to the desired degree of hydrolysis. In an aspect, the pH of the gelatin suspension during hydrolysis is from about 5.0 to about 9.0. In an aspect, the pH of the gelatin suspension during hydrolysis is about 5.5. In an aspect, the pH of the gelatin suspension during hydrolysis is about 8. In an aspect, the temperature of the gelatin suspension during hydrolysis is from about 30° C. to about 60° C. In an aspect, the temperature of the gelatin suspension during hydrolysis is from about 45° C. to about 55° C. In an aspect, the temperature of the gelatin suspension during hydrolysis is from about 35° C. to about 45° C. In an aspect, the temperature of the gelatin suspension during hydrolysis is about 50° C. In an aspect, the temperature of the gelatin suspension during hydrolysis is about 40° C. In an aspect, the hydrolysis of the gelatin suspension is carried out for a time of from about 2 to about 6 hours. In an aspect, the hydrolysis of the gelatin suspension is carried out for a time of from about 30 minutes to about 120 minutes. In an aspect, the hydrolysis of the gelatin suspension is carried out for a time of from about 45 minutes to about 90 minutes.

In an aspect, the hydrolysis of the gelatin suspension is terminated by increasing the heat and/or the pH to a temperature and/or pH wherein the enzyme activity ceases.

In an aspect of the present method, the turkey collagen hydrolysate is dried after completion of the desired hydrolysis. In an aspect, the turkey collagen hydrolysate is dried to degree sufficient to provide a dry powder product that is stable for storage, distribution, blending with dry ingredient systems and/or mixing with liquid components. In an aspect, the drying is by freeze-drying or spray-drying. In an aspect, the powder composition of the turkey collagen hydrolysate has a moisture content of about 10 wt % or less. In an aspect, the powder composition of the turkey collagen hydrolysate has a moisture content of about 2 to 10 wt %. In an aspect, the powder composition of the turkey collagen hydrolysate has a moisture content of about 5 to 10 wt %. In an aspect, the powder composition of the turkey collagen hydrolysate has a moisture content of about 7 to 10 wt %. In an aspect, the powder composition of the turkey collagen hydrolysate has a moisture content of about 2 to 6 wt %. In an aspect, the powder composition of the turkey collagen hydrolysate has a moisture content of about 5 wt % or less.

In an aspect, the gelatin used in this process is obtained by
i) obtaining turkey parts comprising collagen containing components,
ii) separating the collagen containing components from lean muscle, skin and bone material;
iii) heating the collagen containing components for a time sufficient to achieve solubilization of at least 20% of the collagen to form gelatin;
iv) removing at least a portion of oil and fat; and
v) filtering to remove insoluble material to provide the gelatin obtained from a turkey.

In an aspect, the gelatin used in this process is obtained by
i) obtaining turkey parts comprising collagen containing components,
ii) heating the collagen containing components for a time sufficient to achieve solubilization of at least 20% of the collagen to form gelatin;
iii) removing at least a portion of oil and fat; and
iv) filtering to remove insoluble material to provide the gelatin obtained from a turkey.

In an aspect, the collagen containing components are heated in a media comprising water. In an aspect, the heating of the collagen containing components to achieve solubilization of at least 20% of the collagen to form gelatin is carried out at a temperature of from about 80° C. to 90° C. for from about 5 to about 20 hours, or from about 8 to about 18 hours, or from about 12 to about 16 hours. In an aspect, the heating of the collagen containing components to convert the collagen to gelatin and extract it to water is carried out at a temperature of from about 80° C. to 90° C., or at about 85° C. for from about 1 to about 3 hours, followed by heating at a temperature of from about 70° C. to 80° C., or at about 75° C., for from about 2 to about 6 hours.

In an aspect, water as necessary may be added to facilitate gelatin formation, and to enable formation and decanting/removal of a floating layer of oil and fat. Addition of water also in an aspect is carried out to facilitate heat transfer, mixing of ingredients and/or solubilization of the gelatin. In an aspect, the above methods further comprise adding water to the collagen containing components prior to heating. In an aspect, the above methods further comprise adding water to the collagen containing components during and/or after heating.

In an aspect, fat is removed to an amount of about 2 wt % or less based on total protein. In an aspect, fat is removed to an amount of about 1 wt % or less based on total protein. In an aspect, fat is removed to an amount of about 0.5 wt % or less based on total protein. In an aspect, fat is removed to an amount of about 0.1 wt % or less based on total protein.

In an aspect, the turkey parts comprising collagen are selected from the keel, the wings, the leg, and portions and mixtures thereof. In an aspect, the turkey parts comprising collagen comprise the keel and drums. In an aspect, the turkey parts comprising collagen comprise the keel. In an aspect, the portions of the turkey parts that contain collagen specifically include the keel (which is primarily cartilage), the tendons, ligaments and other connective tissue comprising collagen. In an aspect, other portions of the turkey contain a significant amount collagen and can be used in the methods described herein, including but not limited to the skin and bones. In an aspect, the turkey parts comprising collagen are selected from skin, bone, and mixtures thereof. In an aspect, the turkey parts comprising collagen are selected from skin, bone, the keel, the wings, the legs, and portions and mixtures thereof. In an aspect, the turkey parts comprising collagen comprise skin and bone. In an aspect, the turkey parts comprising collagen comprise bone. In an aspect, the turkey parts comprising collagen comprise skin.

In an aspect, certain collagen containing components in the keel, the wings, and/or the leg can be separated from lean muscle, skin and bone material. In an aspect, the separation is carried out in part by mechanical separation equipment. For example, machines used to debone drums and similar turkey parts are available from Poss Design Limited, Oakville, Ontario, Canada. In an aspect, collagen-containing turkey parts that have lean muscle, skin and/or bone material removed may still contain trace or even significant amounts of skin and/or bone.

As noted above, turkey is a particularly advantageous collagen source not only for its unique protein amino acid profile, but because of the relative ease of processing by mechanical separation equipment. The present compositions utilize this unique collagen material in a manner not previously appreciated.

In an aspect, the proteins of the turkey collagen hydrolysate composition are solely sourced from turkey collagen. In this aspect, the turkey collagen hydrolysate composition product can provide a "complete protein" as defined by the Protein Digestibility Corrected Amino Acid Score (PDCAAS) method, while simultaneously being advantageously labelled with the "clean" label of comprising only proteins sourced from turkey collagen.

In an aspect, the proteins of the turkey collagen hydrolysate composition are sourced from turkey collagen, and may additionally be augmented with proteins sourced from muscle portions of the turkey. This augmentation may be desirable, because the muscle portions may contain higher amounts of particularly desirable amino acids, such as tryptophan. In this aspect, the turkey collagen hydrolysate composition product can provide an enhanced "complete protein" contribution as defined by the Protein Digestibility Corrected Amino Acid Score (PDCAAS) method, while simultaneously being advantageously labelled with the "clean" label of comprising only proteins sourced from turkey. In an aspect, the turkey collagen hydrolysate composition may comprise a mixture of proteins sourced from turkey collagen and proteins sourced from muscle portions of the turkey, wherein at least 60 wt % of the proteins are sourced from turkey collagen. In an aspect, the turkey collagen hydrolysate composition may comprise a mixture of proteins sourced from turkey collagen and proteins sourced from muscle portions of the turkey, wherein at least 70 wt % of the proteins are sourced from turkey collagen. In an aspect, the turkey collagen hydrolysate composition may comprise a mixture of proteins sourced from turkey collagen and proteins sourced from muscle portions of the turkey, wherein at least 80 wt % of the proteins are sourced from turkey collagen. In an aspect, the turkey collagen hydrolysate composition may comprise a mixture of proteins sourced from turkey collagen and proteins sourced from muscle portions of the turkey, wherein at least 90 wt % of the proteins are sourced from turkey collagen.

In an aspect, the turkey collagen hydrolysate composition is used as a nutritional or dietary supplement for humans or pets. In an aspect, the turkey collagen hydrolysate composition can be used as a dietary supplement or topical composition for joint health, tendon health, hair and nail health, health conditions associated with aging, and exercise recovery. In an aspect, the turkey collagen hydrolysate composition is provided in a dry format suitable for administration to a person or animal (including pets), such as in pill or capsule form. In an aspect, the turkey collagen hydrolysate composition is provided in a premeasured package for addition to a food product, including a liquid food product such as a beverage or soup. In an aspect, the food product is a confection. In an aspect, the food product is a pet food product.

In an aspect, a turkey collagen hydrolysate solution is provided that comprises water and the turkey collagen hydrolysate composition as described herein. In an aspect, the turkey collagen hydrolysate composition is present in the solution in an amount of from about 0.5 to about 20 wt %.

In an aspect, the turkey collagen hydrolysate composition is provided in a sports drink format comprising optional additional ingredients, such as flavors, sweeteners, caffeine, and the like.

In an aspect, the turkey collagen hydrolysate composition is used as a personal care or pet care composition. In an aspect, the personal care or pet care composition can be a lotion, cream, cosmetic, sunscreen, shampoo, or soap.

EXAMPLES

Starting Materials

Example 1

Boneless Turkey Drum Residue

Turkey drums were deboned, and then mechanically processed in a separator to separate lean muscle from a by-product stream that contains connective tissue (sinews) and is rich in collagen. This by-product stream is referred to as "boneless turkey drum residue," and is the material that is further processed to obtain the desired turkey collagen hydrolysates.

Example 2

Isolated Connective Tissue from Turkey Drums

Whole turkey drums were manually dissected with knives to recover connective tissues (ligaments and tendons). The connective tissues were washed three times with an excess of distilled water to remove substantially all of the residual muscle tissues. This is referred to as "Isolated drum tendons." It was then freeze-dried to provide a freeze dried drum tendon.

Example 3

Keel Residue

Turkey breast comprising the keel and two breast lobes was pulled off the carcass as "natural fall" (i.e., prior to any trimming and deboning of the breast). The keel was mechanically separated from the two lobes and freeze dried. This sample is referred to herein as "Keel residue."

Example 4

Isolated Cartilage from Turkey Keels

Intact keels that were separated from the breasts of individual turkeys were handled separately by washing three times with an excess of distilled water to remove substantially all of the residual muscle tissues to provide isolated cartilage keel samples. The keel from a first bird was freeze dried separately from the keel from a second bird, thereby providing samples identified as Keel 1 and Keel 2.

Example 5

Comparison Proximate and Amino Acid Analysis of Boneless Turkey Drums and Turkey Keels Boneless turkey drum residue and Isolated Connective Tissue from Turkey Drums of Examples 1 and 2, respectively, the Keel Residue of Example 3, and Keel 1 and Keel 2 of Example 4 were analyzed for their proximate composition prior to hydrolysis, as reported in Table 1 and amino acid profile as reported in Table 2.

TABLE 1

Proximate Analysis

| Sample | Fat[1] (%) | Moisture[2] (%) | Ash[3] (%) | Protein[4] (%) |
|---|---|---|---|---|
| Drum Residue (Ex. 1) | 24.9 | 4.01 | 16.6 | 55.7 |
| Drum Tendons (Ex. 2) | 17.0 | 4.58 | 19.4 | 73.1 |
| Keel Residue (Ex 3) | 12.2 | 4.37 | 4.36 | 86.6 |
| Keel 1 (Ex. 4) | 29.0 | 2.16 | 5.41 | 65.2 |
| Keel 2 (Ex. 4) | 2.15 | 6.75 | 9.69 | 71.4 |

[1]AOCS Ba 3-38 Mod. Crude fat by petroleum ether extraction
[2]Moisture by AOAC 930.15 (Moisture by Forced Draft Oven)
[3]AOAC 942.05
[4]AOAC 992.15

TABLE 2

Amino Acid Analysis (w/w %)

| Amino acid | Drum Residue (Ex. 1) | Drum Tendons (Ex. 2) | Keel Residue (Ex 3) | Keel 1 (Ex. 4) | Keel 2 (Ex. 4) |
|---|---|---|---|---|---|
| Taurine | 0.29 | 0.15 | 0.13 | 0.08 | 0.10 |
| Hydroxyproline | 4.23 | 5.45 | 6.46 | 3.88 | 2.12 |
| Aspartic Acid | 3.45 | 4.14 | 5.10 | 5.79 | 6.17 |
| Threonine | 1.38 | 1.63 | 2.01 | 2.48 | 2.86 |
| Serine | 1.41 | 1.59 | 2.04 | 2.09 | 2.14 |
| Glutamic Acid | 5.54 | 6.61 | 8.34 | 9.13 | 9.98 |
| Proline | 4.98 | 6.65 | 7.99 | 6.09 | 4.37 |
| Glycine | 8.99 | 11.83 | 13.32 | 9.92 | 6.80 |
| Alanine | 4.15 | 5.43 | 6.32 | 5.57 | 4.70 |
| Cysteine | 0.25 | 0.30 | 0.32 | 0.63 | 0.73 |
| Valine | 1.48 | 1.73 | 2.38 | 2.85 | 3.25 |
| Methionine | 0.78 | 0.93 | 1.03 | 1.60 | 1.70 |
| Isoleucine | 1.25 | 1.41 | 1.83 | 2.57 | 3.06 |
| Leucine | 2.28 | 2.62 | 3.36 | 4.36 | 5.08 |
| Tyrosine | 0.89 | 0.94 | 1.90 | 2.15 | 2.80 |
| Phenylalanine | 1.61 | 1.91 | 2.17 | 2.51 | 2.68 |
| Hydroxylysine | 0.53 | 0.85 | 0.87 | 0.56 | 0.55 |
| Ornithine | 0.02 | 0.03 | 0.05 | 0.07 | 0.13 |
| Lysine | 2.41 | 2.68 | 3.35 | 4.60 | 5.25 |
| Histidine | 0.62 | 0.69 | 1.12 | 1.51 | 2.27 |
| Arginine | 3.94 | 5.00 | 6.05 | 5.64 | 5.16 |
| Tryptophan | 0.18 | 0.23 | 0.30 | 0.53 | 0.75 |

Because this amino acid analysis is carried out on "as is" raw materials prior to hydrolysis and accompanying processing steps, the overall protein content of the samples are lower than the desired 80% protein concentration. Therefore, the amounts of amino acid as reported in Table 2 is relatively low on a w/w % based on sample weight. However, this data does show proportional comparison of amino acids in drum and keel samples. Specifically, this data shows that turkey drum and keel collagen materials are a good source of a wide distribution of amino acids, and especially glycine, hydroxyproline, proline, taurine and, tryptophan.

Additionally, the data show that the amino acid content of some amino acids, such as taurine, is higher in drum residue (i.e., containing some muscle tissue) than in drum tendons (which does not contain muscle tissue). Thus, the relative amino acid content of some amino acids in collagen based compositions can be augmented by incorporation of proteins derived from muscle tissue of turkey.

The data also shows that different amino acid profiles are obtained depending on the location of the source of the collagen. Thus, the amino acid profile for certain applications may be more favorable if sourced from drums, or if sourced from keel, or if sourced from a combination of drums and keel, depending on the desired use.

Gelatin

Example 6

Processing of Boneless Turkey Drum Residue to Obtain Gelatin 400 grams of distilled water was added to 100 grams of boneless turkey drum residue from Example 1 and heated to 85° C. in a water bath with periodic mixing. After 60 minutes the temperature of the mixture was reduced to 75° C. where it was held for an additional 120 minutes. The mixture was removed from the water bath and left to cool to room temperature. Oil and fat that accumulated at the surface was removed by spooning off and decanting. The mixture was then filtered with Whatman glass microfiber filters having a pore size of 0.7 um. Filtration removed most of the insoluble material (insoluble protein, pieces of skin, tendon fragments etc.) and yielded a filtrate (i.e., permeate) that contained primarily soluble gelatin. The filtrate may be hydrolyzed without an intermediate treatment, or may be freeze dried to provide a freeze dried gelatin product.

Example 7

Processing of Isolated Drum Tendons to Obtain Gelatin 400 grams of distilled water was added to 100 grams of isolated drum tendons from Example 2 and heated to 85° C. in a water bath with periodic mixing. After 60 minutes the temperature of the mixture was reduced to 75° C. where it was held for an additional 120 minutes. The mixture was removed from the water bath and left to cool to room temperature. Oil and fat that accumulated at the surface was removed by spooning off and decanting. The mixture was then filtered with Whatman glass microfiber filters having a pore size of 0.7 um. Filtration removed most of the insoluble material and yielded a filtrate (i.e., permeate) that contained primarily soluble gelatin. The filtrate may be hydrolyzed without an intermediate treatment, or may be freeze dried to provide a freeze dried gelatin product.

Example 8

Processing of Keel Residue to Obtain Gelatin 400 grams of distilled water was added to 100 grams of turkey keel residue of Example 3, and heated to 85° C. in a water bath with periodic mixing. After 60 minutes the temperature of the mixture was reduced to 75° C. where it was held for an additional 120 minutes. The mixture was removed from the water bath and left to cool to room temperature. Oil and fat that accumulated at the surface was removed by spooning off and decanting. The mixture was then filtered with Whatman glass microfiber filters with a pore size of 0.7 um. Filtration removed most of the insoluble material and yielded a filtrate (i.e., permeate) that contained primarily gelatin. The filtrate may be hydrolyzed without an intermediate treatment, or may be freeze dried to provide a freeze dried gelatin product.

Example 9

Processing of Keel 1 and Keel 2 to Obtain Gelatin 400 grams of distilled water was added to 100 grams of Keel 1 of Example 4, and heated to 85° C. in a water bath with periodic mixing. After 60 minutes the temperature of the mixture was reduced to 75° C. where it was held for an additional 120 minutes. The mixture was removed from the water bath and left to cool to room temperature. Oil and fat that accumulated at the surface was removed by spooning off and decanting. The mixture was then filtered with Whatman glass microfiber filters with a pore size of 0.7 um. Filtration removed most of the insoluble material and yielded a filtrate (i.e., permeate) that contained primarily gelatin, referred to herein as Keel 1 Gelatin. The filtrate may be hydrolyzed without an intermediate treatment, or may be freeze dried to provide a freeze dried gelatin product.

The above procedure was also carried out using Keel 2 instead of Keel 1. The resulting product is referred to herein as Keel 2 Gelatin.

Collagen Peptides

Example 10

Turkey Collagen Peptides from Turkey Drum Residue

A Turkey Drum Residue gelatin is prepared as describe in example 6, except that instead of cooling to room temperature, the mixture is cooled to 45° C. in a water bath with continuous mixing. Oil and fat are removed from this composition, and the composition is filtered to remove most of the insoluble material and yield a filtrate (i.e., permeate) that contains primarily gelatin. The pH of the resulting gelatin medium is adjusted to 8.0 with sodium hydroxide and mixed for an additional 15 minutes. The pH is monitored thereafter and adjusted as necessary. The enzyme alcalase (Novozymes) is added at an enzyme to substrate ratio of 1:100 w/w %. The alcalase hydrolysis reaction is run for 2 hours with continuous mixing. pH is monitored every 30 minutes and readjusted to 8.0 as necessary. After the 120 minutes, the pH is adjusted to 6.0 using hydrochloric acid and a second enzyme having high protease and peptidase activity (Protease M SD-K; Amano Enzymes, Elgin, Illinois) is added as a solid at a ratio of 1:50 (w/w %) enzyme to the substrate. The Protease M hydrolysis reaction is run for an additional 2 hours. pH is monitored every 30 minutes and readjusted to 6.0 as necessary. Following enzymatic hydrolysis, the enzymes are deactivated by adjusting the pH to 7.0 using sodium hydroxide, and then heating the mixture to 75° C. for 5 minutes. The turkey collagen peptide preparation is cooled down to room temperature and dried for later use, for example using a freeze dryer.

Example 11

Preparation of Collagen Hydrolysate Samples

Two samples of the boneless turkey drum residues from Example 1 were separately processed into Gelatin Samples 1 and 2, and these samples were separately hydrolyzed and dried to provide Turkey Collagen Peptides for analysis. The two separate samples as prepared were identified as TCP1 and TCP2. Proximate analysis evaluations were carried out on these compositions, with the results shown in Table 3:

TABLE 3

| Sample | Fat | Moisture | Ash | Protein |
|---|---|---|---|---|
| TCP1 | <0.10 | 5.12 | 2.22 | 97.0 |
| TCP2 | <0.10 | 2.60 | 3.32 | 97.7 |

Analysis

Example 12

Degree of Hydrolysis of Prepared Samples and Commercially Available Protein Hydrolysates Collagen hydrolysate samples TCP1 and TCP2 as described above in Example 11, and commercially available collagen hydrolysate compositions were evaluated to determine the Degree of Hydrolysis, as reported in Table 4.

TABLE 4

| Sample | DH |
|---|---|
| TCP1 | 57.7 |
| TCP2 | 55.1 |
| Rousselot Peptan | 30.1 |
| Vital Protein - Bovine | 20.5 |
| Gelita - Verisol | 35.5 |
| Gelita - Fortigel | 22.4 |
| Gelita - Bodybalance | 26.8 |
| Vyse - Porcine | 26.0 |
| Vital Protein - Marine Collagen | 18.3 |

Example 13

MW Distribution of Prepared Samples and Commercially Available Protein Hydrolysates Collagen hydrolysate samples TCP1 and TCP2 as described above in Example 11, and commercially available collagen hydrolysate compositions were evaluated by size exclusion HPLC to determine the molecular weight distribution and peptide size profile. To determine the molecular weight distribution of the collagen hydrolysates, SE-HPLC was performed on samples (150 mg) solubilized in 10 ml water for 1 hour. The suspension was centrifuged at 10,000 rpm for 10 min, followed by filtering the supernatant using a 0.45 um regenerated cellulose syringe filter into a 2 mL HPLC vial. An aliquot (10 µL) of diluted supernatant was injected to GE Healthcare Superdex 30 10/300 GL. The proteins were eluted with 20 mM sodium phosphate and 280 mM sodium chloride with a flow rate of 0.5 mL/min. The temperature of the column was set at 25° C. and the total run time was 60 minutes. Proteins were detected at 214 nm. The samples as evaluated additionally contained standard amino acid containing compounds to provide reference peaks.

HPLC chromatograms showing molecular weight distribution and peptide size profile results are shown in FIGS. 3-8, wherein reference peaks corresponding to Conalbumin (75 k Da) at about 15.5 minutes, Ribonuclease A (44 k Da) at about 17.25 minutes, Aprotinin (7 L Da) at about 20.75 minutes, and Glycine (75 Da) at about 35.75 minutes can be seen.

Figure 3:
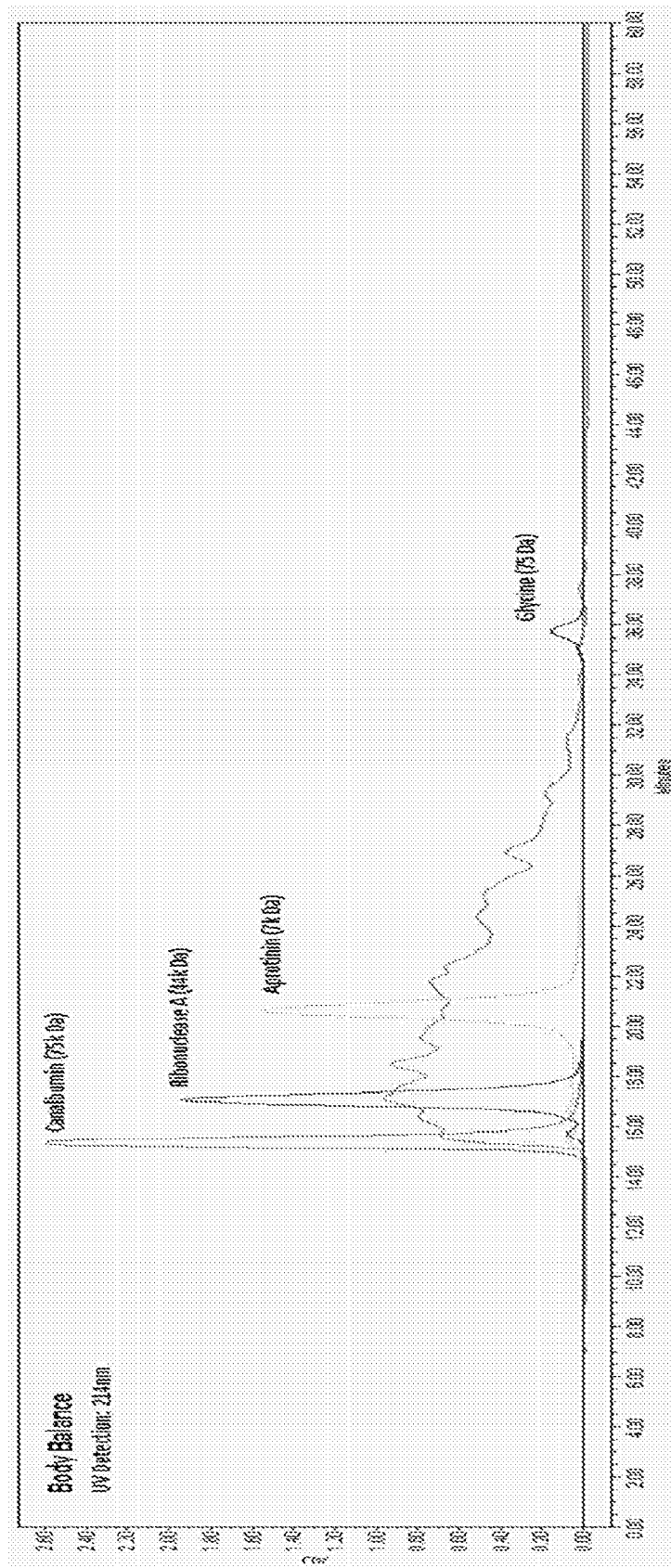
FIG. 3 is an HPLC chromatogram showing molecular weight distribution and peptide size profile of a commercially available hydrolysate composition.

FIG. 3 shows the HPLC chromatogram of Body Balance, a commercially available collagen hydrolysate composition. As is apparent by inspection of this HPLC chromatogram, about half of this commercially available collagen hydrolysate composition has a molecular weight above 7,000 Daltons, and about a third of this commercially available collagen hydrolysate composition has a molecular weight above 15,000 Daltons.

Figure 4:
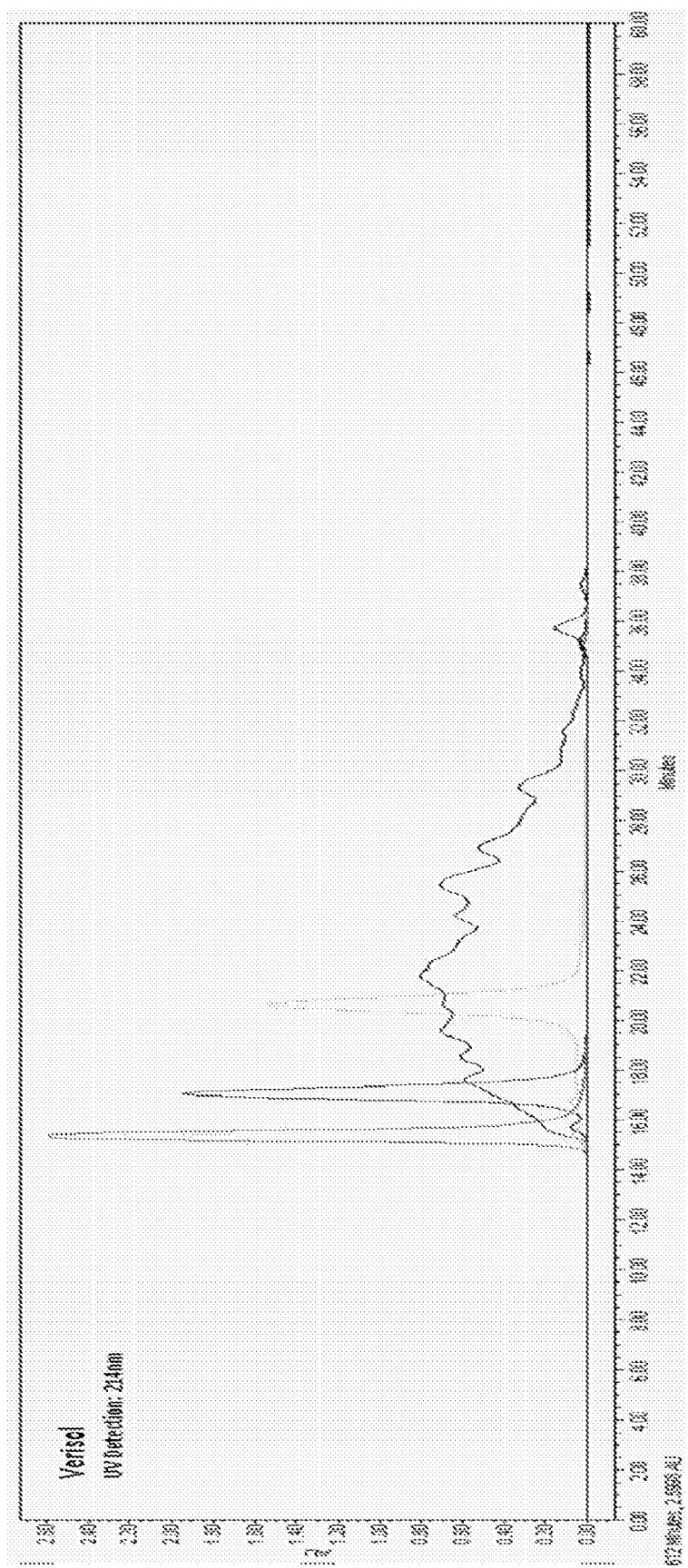
FIG. 4 is an HPLC chromatogram showing molecular weight distribution and peptide size profile of another commercially available hydrolysate composition.

FIG. 4 shows the HPLC chromatogram of Verisol, a commercially available collagen hydrolysate composition. As is apparent by inspection of this HPLC chromatogram, about a third of this commercially available collagen hydrolysate composition has a molecular weight above 7,000 Daltons.

Figure 5:
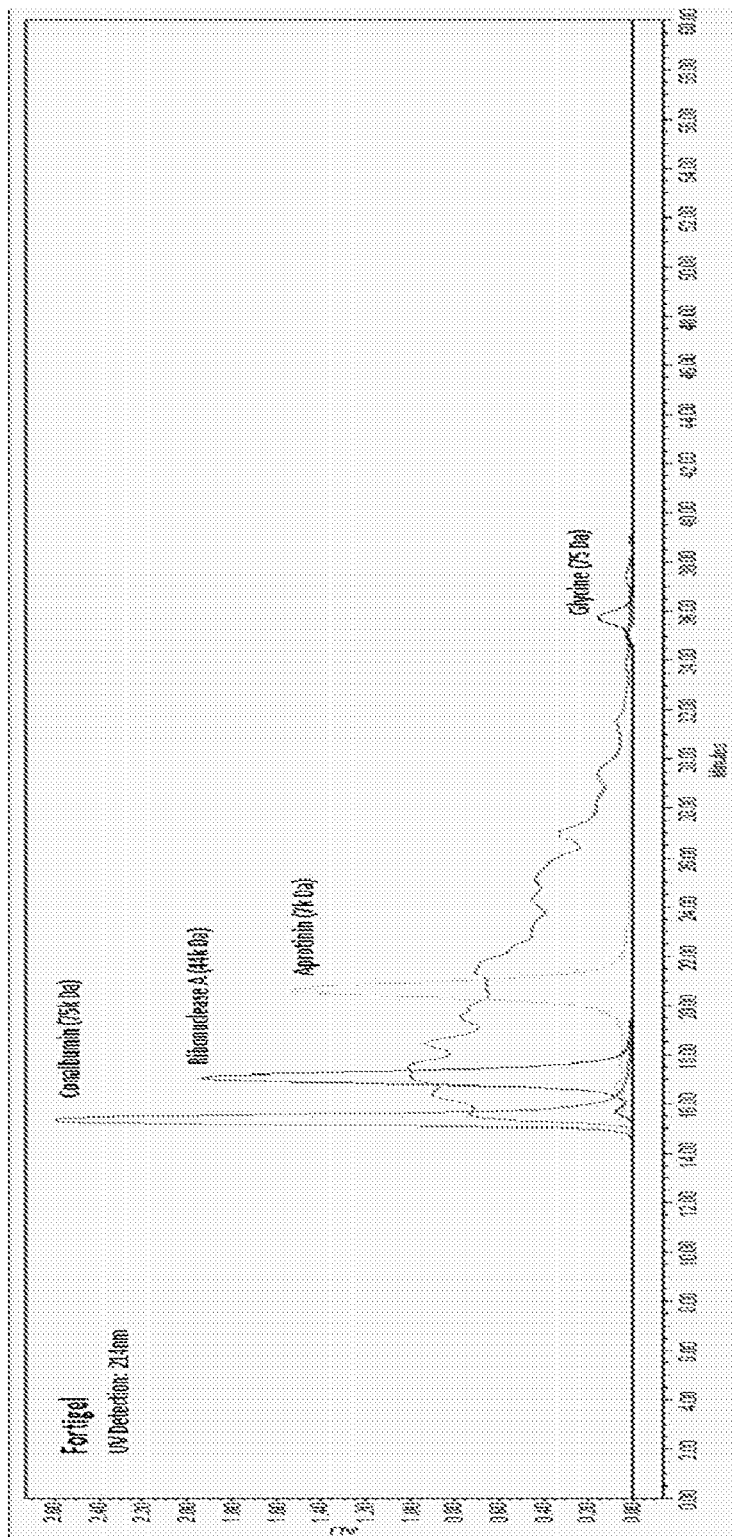
FIG. 5 is an HPLC chromatogram showing molecular weight distribution and peptide size profile of another commercially available hydrolysate composition.

FIG. 5 shows the HPLC chromatogram of Fortigel, a commercially available collagen hydrolysate composition. As is apparent by inspection of this HPLC chromatogram, about half of this commercially available collagen hydrolysate composition has a molecular weight above 7,000 Daltons, and about a third of this commercially available collagen hydrolysate composition has a molecular weight above 15,000 Daltons.

Figure 6:
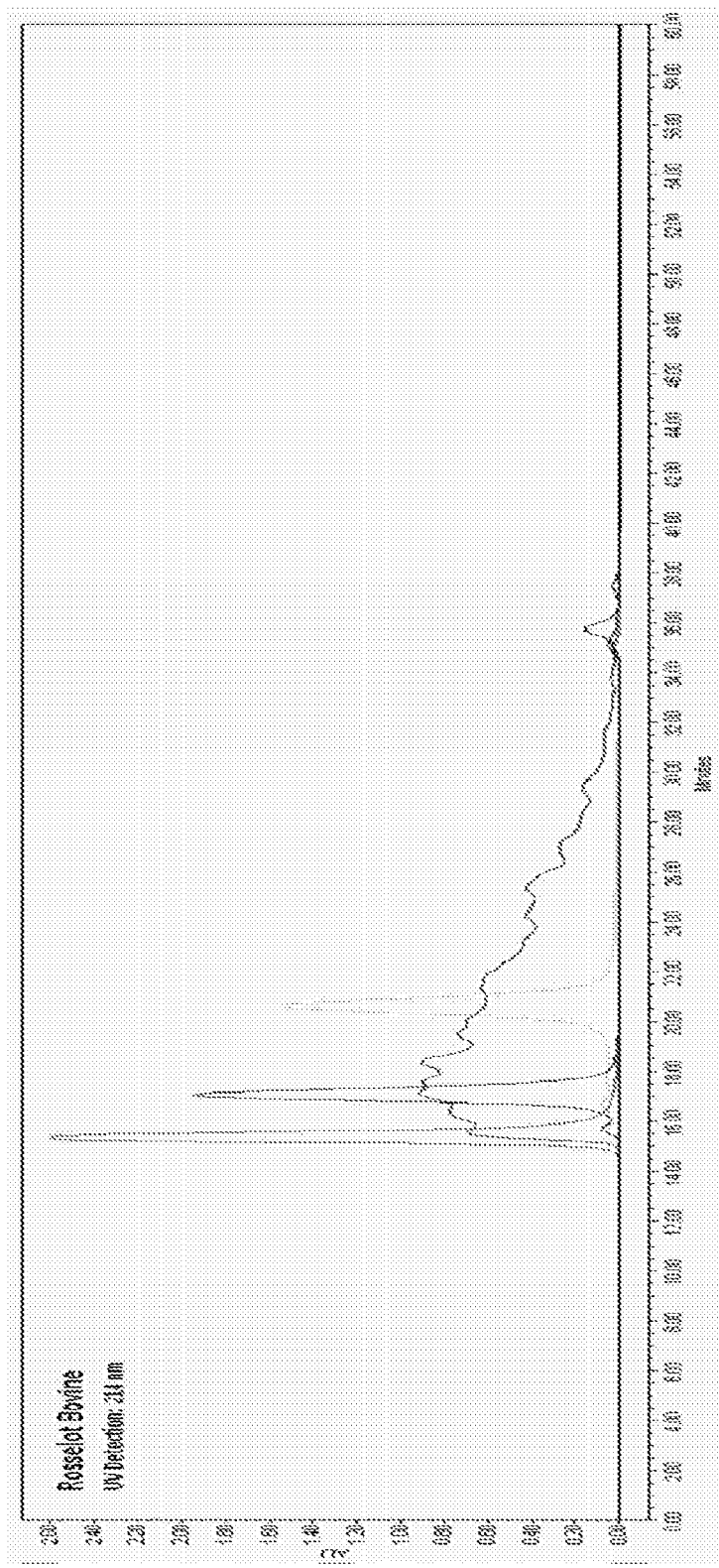
FIG. 6 is an HPLC chromatogram showing molecular weight distribution and peptide size profile of another commercially available hydrolysate composition.

FIG. 6 shows the HPLC chromatogram of Rousselot Peptan, a commercially available collagen hydrolysate composition. As is apparent by inspection of this HPLC chromatogram, about half of this commercially available collagen hydrolysate composition has a molecular weight above 7,000 Daltons, and about a third of this commercially available collagen hydrolysate composition has a molecular weight above 15,000 Daltons.

Figure 7:
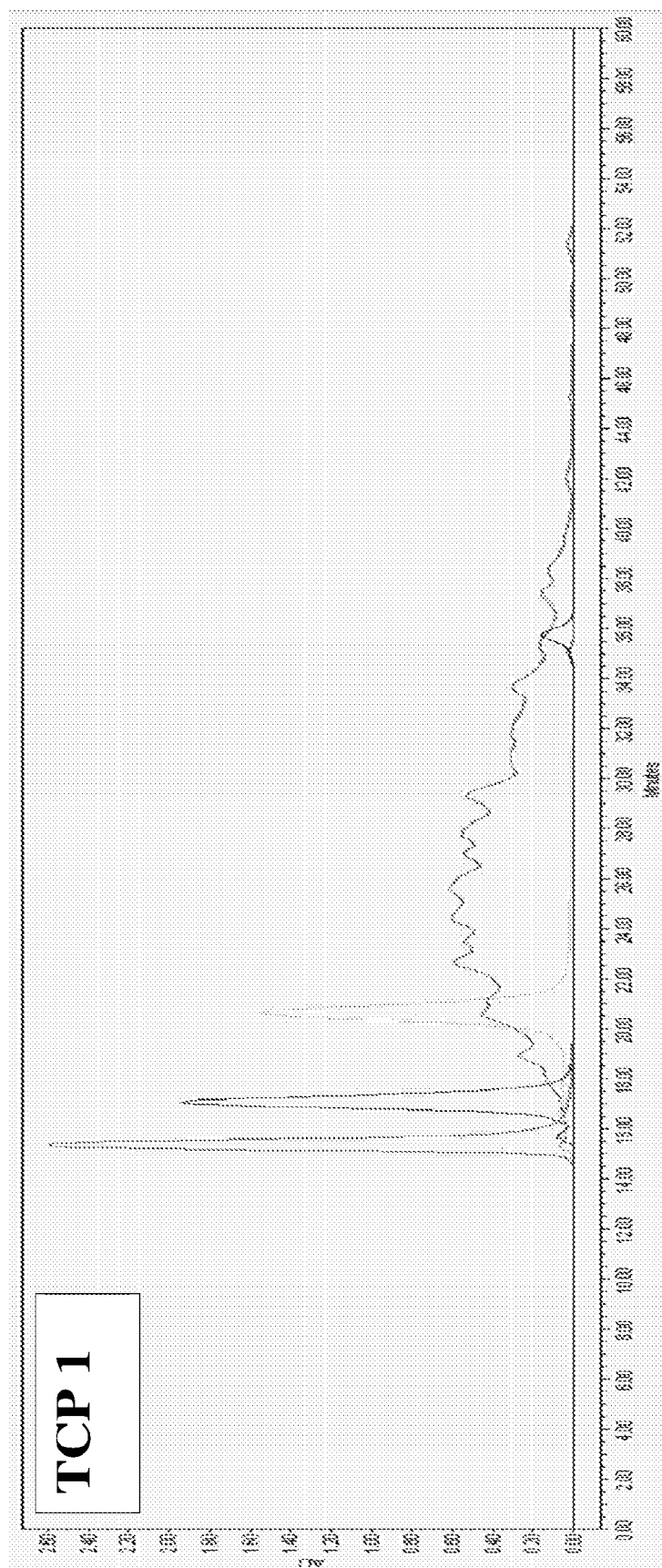
FIG. 7 is an HPLC chromatogram showing molecular weight distribution and peptide size profile of an aspect of the present invention.

FIG. 7 shows the HPLC chromatogram of TCP1, a turkey collagen hydrolysate composition described in Example 11. As is apparent by inspection of this HPLC chromatogram, the majority of this collagen hydrolysate composition has a molecular weight between 500 and 10,000 Daltons.

Figure 8:
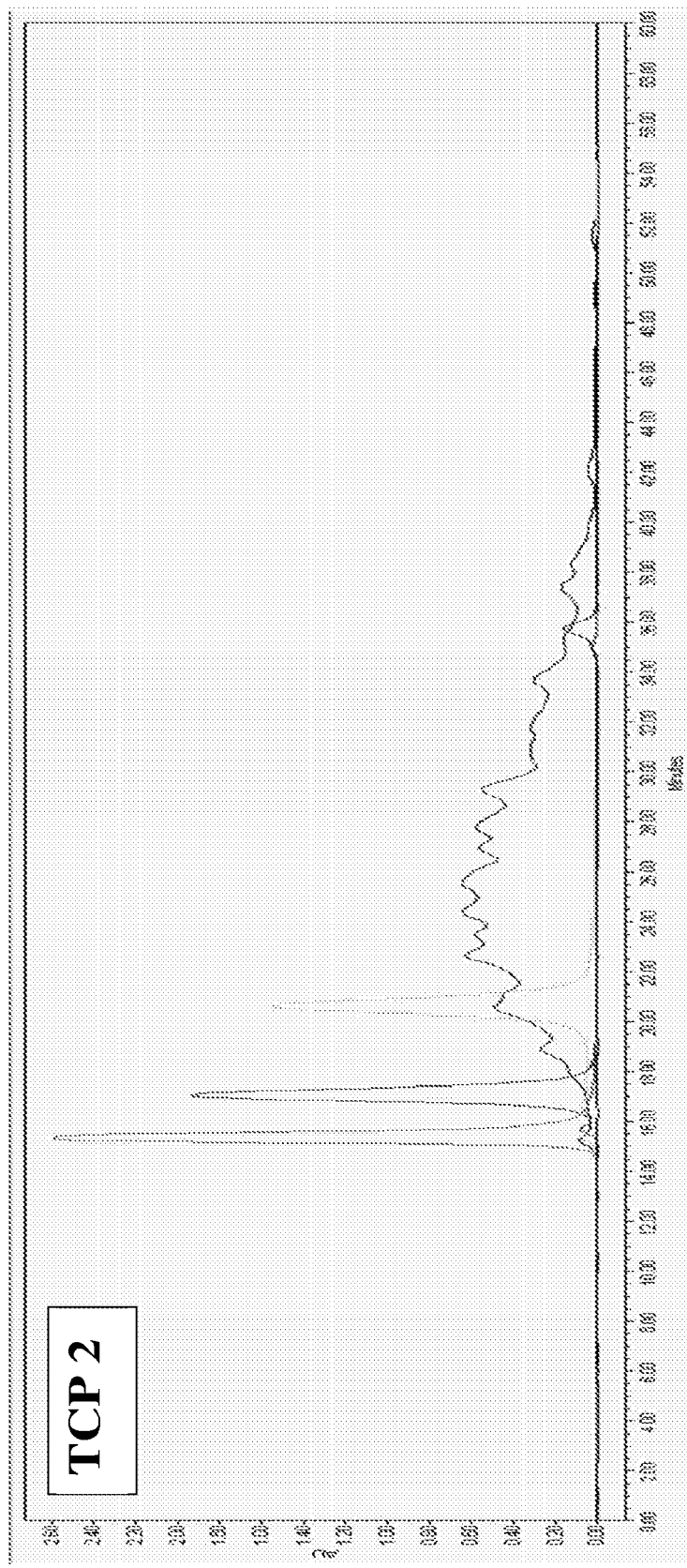
FIG. 8 is an HPLC chromatogram showing molecular weight distribution and peptide size profile of an aspect of the present invention.

FIG. 8 shows the HPLC chromatogram of TCP2, a turkey collagen hydrolysate composition described in Example 11. As is apparent by inspection of this HPLC chromatogram, the majority of this collagen hydrolysate composition has a molecular weight between 500 and 10,000 Daltons.

Example 14

Amino Acid Analysis of Commercially Available Protein Hydrolysates (Comparative)

Amino acid analysis was carried out on commercially available hydrolysate compositions to determine the amounts of certain amino acids present in these compositions. Results are reported in Table 5.

TABLE 5

| Amino Acid Analysis (w/w %) | | | | | | |
|---|---|---|---|---|---|---|
| Amino acid | #1 | #2 | #3 | #4 | #5 | #6 |
| Taurine | 0.01 | 0.03 | 0.00 | 0.00 | 0.00 | 0.00 |
| Hydroxyproline | 9.42 | 9.11 | 11.6 | 11.8 | 11.9 | 10.2 |
| Aspartic Acid | 5.64 | 6.02 | 5.8 | 5.78 | 5.77 | 5.20 |
| Threonine | 1.85 | 2.05 | 1.85 | 1.89 | 1.89 | 2.75 |
| Serine | 2.84 | 2.75 | 3.16 | 3.27 | 3.22 | 2.95 |
| Glutamic Acid | 9.70 | 10.3 | 10.2 | 10.2 | 10.0 | 9.63 |
| Proline | 13.5 | 12.2 | 13.5 | 13.9 | 13.8 | 13.4 |
| Glycine | 21.3 | 21.7 | 20.7 | 21.4 | 22.1 | 24.4 |
| Alanine | 8.93 | 8.52 | 9.30 | 9.24 | 9.39 | 10.64 |
| Cysteine | 0.09 | 0.14 | 0.04 | 0.04 | 0.04 | 0.03 |
| Valine | 2.23 | 2.72 | 2.40 | 2.39 | 2.44 | 2.28 |
| Methionine | 0.93 | 1.06 | 0.90 | 0.90 | 0.90 | 1.56 |
| Isoleucine | 1.59 | 1.59 | 1.60 | 1.57 | 1.58 | 1.34 |
| Leucine | 2.93 | 3.44 | 2.94 | 2.90 | 2.94 | 2.50 |
| Tyrosine | 0.56 | 0.91 | 0.44 | 0.46 | 0.45 | 0.27 |
| Phenylalanine | 2.00 | 2.20 | 1.93 | 1.93 | 1.91 | 2.02 |

TABLE 5-continued

Amino Acid Analysis (w/w %)

| Amino acid | #1 | #2 | #3 | #4 | #5 | #6 |
|---|---|---|---|---|---|---|
| Hydroxylysine | 1.02 | 0.98 | 1.01 | 1.11 | 1.07 | 1.06 |
| Ornithine | 0.30 | 0.18 | 0.27 | 0.14 | 0.12 | 0.28 |
| Lysine | 3.85 | 4.21 | 3.78 | 3.85 | 3.84 | 3.86 |
| Histidine | 0.70 | 0.86 | 0.58 | 0.66 | 0.60 | 0.56 |
| Arginine | 7.85 | 7.69 | 7.66 | 7.97 | 7.67 | 7.88 |
| Tryptophan | <0.02 | 0.25 | <0.02 | <0.02 | <0.02 | <0.02 |

1 Rousselot Peptan
2 Vyse Porcine
3 Gelita Bodybalance
4 Gelita Fortigel
5 Gelita Verisol
6 Vital Protein Marine The above samples were tested "as is" with respect to moisture content. The above data does not normalize reported values to 10% moisture content.

Notably, the commercial samples as tested do not contain or contain very low amounts of taurine and tryptophan.

Example 15

Amino Acid Analysis of TCP1 and TCP2

Amino acid analysis was carried out on the hydrolysate compositions TCP1 and TCP2 as described in Example 11 to determine the amounts of certain amino acids present in these compositions. Results are reported in Table 6.

TABLE 6

Amino Acid Analysis (w/w %)

| Amino acid | TCP1 | TCP2 |
|---|---|---|
| Taurine | 0.58 | 0.55 |
| Hydroxyproline | 7.85 | 8.18 |
| Aspartic Acid | 5.98 | 5.77 |
| Threonine | 2.40 | 2.34 |
| Serine | 2.57 | 2.36 |
| Glutamic Acid | 9.94 | 9.94 |
| Proline | 9.96 | 10.34 |
| Glycine | 17.1 | 17.70 |
| Alanine | 7.84 | 8.02 |
| Cysteine | 0.35 | 0.32 |
| Valine | 2.50 | 2.63 |
| Methionine | 1.30 | 1.26 |
| Isoleucine | 2.04 | 2.01 |
| Leucine | 3.82 | 3.80 |
| Tyrosine | 1.18 | 1.15 |
| Phenylalanine | 2.39 | 2.48 |
| Hydroxylysine | 0.99 | 1.19 |
| Ornithine | 0.09 | 0.17 |
| Lysine | 4.01 | 3.98 |
| Histidine | 0.94 | 0.98 |
| Arginine | 7.02 | 7.18 |
| Tryptophan | 0.35 | 0.40 |

The above samples were tested "as is" with respect to moisture content. The above data does not normalize reported values to 10% moisture content.

Example 16

Particle Size Analysis of Samples and Commercially Available Protein Hydrolysates Collagen hydrolysate samples TCP1 and TCP2 as described above in Example 11, and commercially available collagen hydrolysate compositions were evaluated to determine the particle sizes of the hydrolysates, using a Malvern Mastersizer 3000 Laser Light Diffraction Particle Size Analyzer. Identified average particles sizes are reported in Table 7.

TABLE 7

| Sample | Average particle size (um) |
|---|---|
| TCP1 | 39.9 |
| TCP2 | 27.9 |
| Rousselot Peptan | 84.2 |
| Vital Protein - Bovine | 121 |
| Gelita - Verisol | 115 |
| Gelita - Fortigel | 128 |
| Gelita - Bodybalance | 132 |
| Vyse - Porcine | 111 |
| Vital Protein - Marine Collagen | 188 |

Example 17

Determination of Collagen Type

The type of collagen present in various protein sources was determined by analysis of the amino acid sequences for peptides in the collagen digest.

Trypsin solution was prepared by adding 10 mg of trypsin (Sigma T1426-250) to 10 mL of 50 mM ammonium bicarbonate buffer (pH 8). ~10 mg of each powder was weighed and mixed with 1 ml of double distilled water. Tubes were heated at 100° C. for solubilization for 2 hours and 0.5 ml of fresh enzyme solution was added and incubated at 50° C. for overnight.

The digested samples were injected onto an HPLC column (Agilent AdvanceBio Peptide Mapping) using an Agilent 1290 Infinity II autosampler and pump. The HPLC column was coupled to a Thermo Q Exactive Plus mass spectrometer set to collect Top 10 data-dependent MS/MS fragmentation data at 35,000 resolution. The data was analyzed using Proteome Discoverer (Thermo Scientific) and searched against the *Meleagris gallopavo* proteomes downloaded from UniProt and NCBI RefSeq.

The sequences are then searched against a proteome database comprising a large number of known protein sequences. The identity of the type of collagen is determined based on correspondence of the "sequence identity" or "sequence coverage" between the sequences corresponding to the characteristic of the respective type.

A sample is considered to contain a given collagen type if the number of matching peptides were >=3 and the Sequest HT score was >20. Indication of the presence of a given collagen type according to this definition is indicated by "+", and lack of indication of the presence of a given collagen type according to this definition is indicated by "-" in Table 8.

TABLE 8

| Description | Drum Residue Gelatin (Ex 6) | Drum Tendon Gelatin (Ex 7) | Keel Residue Gelatin (Ex 8) | Keel 1 Gelatin (Ex 9) | Keel 2 Gelatin (Ex 9) | TCP1 (Ex 11) |
|---|---|---|---|---|---|---|
| Collagen type I | + | + | + | + | + | + |
| Collagen type II | − | − | + | + | + | − |
| Collagen type III | + | + | + | + | − | + |

TABLE 8-continued

| Description | Drum Residue Gelatin (Ex 6) | Drum Tendon Gelatin (Ex 7) | Keel Residue Gelatin (Ex 8) | Keel 1 Gelatin (Ex 9) | Keel 2 Gelatin (Ex 9) | TCP1 (Ex 11) |
|---|---|---|---|---|---|---|
| Collagen type V | + | + | − | + | − | + |

This data shows that gelatin extracted from turkey keel is a good source of types I and II collagen, and may be a source of III collagen as well. Additionally, data shows that gelatin extracted from turkey drum is a good source of types I, III and V collagen.

Compositions comprising collagen sourced from both turkey keel and turkey drum therefore may contain type I, type II, and type III collagen; or may contain type I, type II, type III, and type V collagen.

Example 18

Digestibility of Turkey Collagen Hydrolysates

Digestibility of turkey collagen hydrolysates was evaluated by measurement of free amino group content in incubated blanks containing digestive juices and enzymes as described in Garcia-Campayo, et al. "Digestion of Food Ingredients and Food Using an In Vitro Model Integrating Intestinal Mucosal Enzymes" Food and Nutrition Sciences, 2018, 9, 711-734, http://www.scirp.org/journal/fns.

Figure 9:
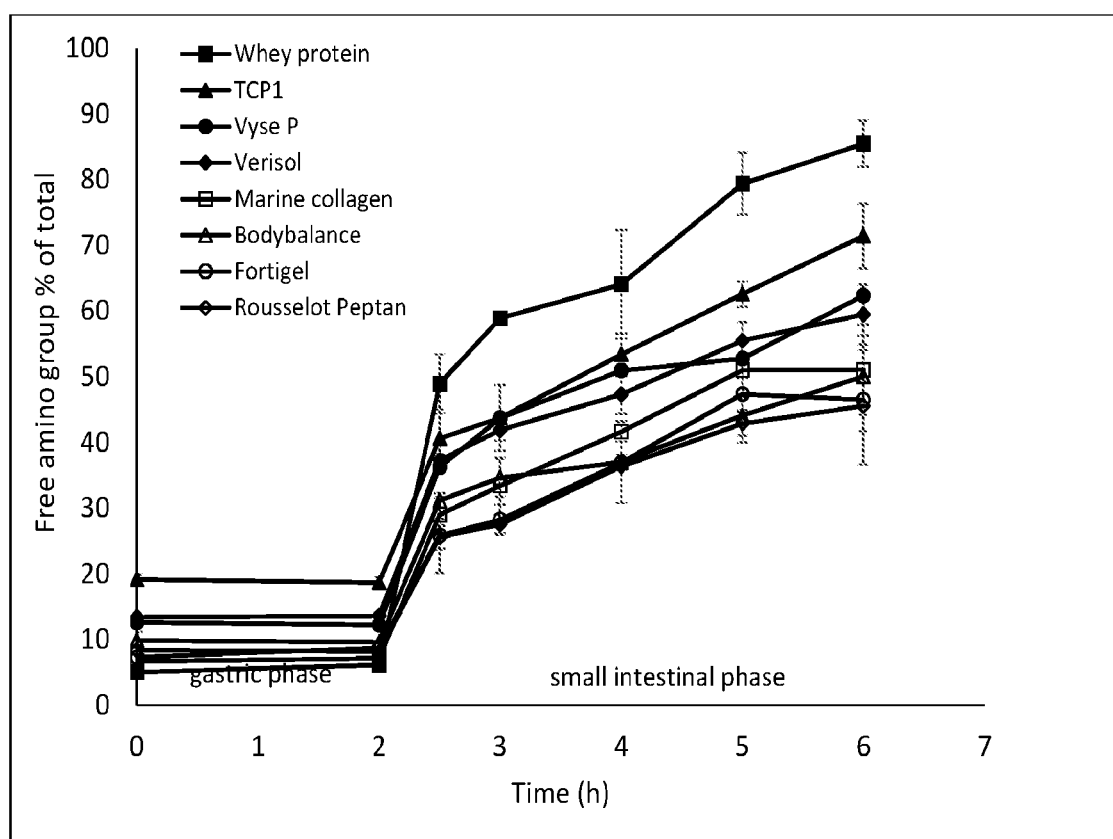
FIG. 9 is a graph showing an evaluation of digestibility of hydrolysates, including a hydrolysate of the present invention.

Results are shown in the graph of FIG. 9, where it can be seen that TCP1 is indicated to be more digestible than all other tested animal sourced hydrolyzed collagen.

Example 19

Processing of Turkey Skin to Obtain Gelatin 400 grams of distilled water was added to 100 grams of turkey breast skin that had been previously removed using a skinner machine. The mixture was heated to 85° C. in a water bath with periodic mixing. After 60 minutes the temperature of the mixture was reduced to 75° C. where it was held for an additional 120 minutes. The mixture was removed from the water bath and left to cool to room temperature. Oil and fat that accumulated at the surface was removed by spooning off and decanting. The mixture was then filtered with Whatman glass microfiber filters having a pore size of 0.7 um. Filtration removed most of the insoluble material (insoluble protein, etc.) and yielded a filtrate (i.e., permeate) that contained primarily soluble gelatin. The filtrate may be hydrolyzed without an intermediate treatment, or may be freeze dried to provide a freeze dried gelatin product.

Example 20

Processing of Turkey Drum Bones to Obtain Gelatin 1600 grams of distilled water was added to 400 grams of turkey bones recovered from lower leg (drum) using a drum punching machine. The mixture of bones and water was heated to 85° C. in a water bath with periodic mixing for 2 hours. The mixture was removed from the water bath and left to cool to room temperature. The oil and fat containing liquid portion was separated by decanting. Degreased bones were dried at 50° C. in an oven for overnight. Degreased, dried bones were then crushed into smaller pieces of about 2-3 inches in length. Demineralization was carried out by soaking 300 g of degreased, dried bones in 1200 ml of 5% HCl for 4 days at room temperature. At the completion of 4 days, the liquid portion was separated by decanting and residual acid levels in degreased, demineralized bones were removed and neutralized by multiple washes with distilled water. The liming reaction was initiated with soaking degreased, demineralized bones in oversaturated lime solution at pH 12.5 for 2 weeks. With the completion of the liming reaction, excess lime was removed and neutralized to pH 7 by adding dilute HCl. Purer degreased, demineralized bones were obtained by separating the liquid portion from the solids.

200 grams of distilled water was added to 50 grams of purer degreased, demineralized bones and heated to 85° C. in a water bath with periodic mixing for 2 hours. The mixture was removed from the water bath and left to cool to room temperature. The mixture was then filtered with Whatman glass microfiber filters having a pore size of 0.7 um. Filtration removed most of the insoluble material (insoluble protein, etc.) and yielded a filtrate (i.e., permeate) that contained primarily soluble gelatin. The filtrate may be hydrolyzed without an intermediate treatment, or may be freeze dried to provide a freeze dried gelatin product.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system.

Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values.

Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A turkey collagen hydrolysate composition prepared from turkey collagen sources, wherein the composition has:
    a protein concentration of from about 80 wt % to 100 wt %;
    a protein molecular weight distribution wherein from about 80% to 100% of protein in the turkey collagen hydrolysate composition has a molecular weight of from about 500 to about 15,000 Daltons;
    a protein solubility of from about 97% to 100% at pH 7.0, at pH 3.4, at pH 5, or at each of pH 7.0, pH 5, and pH 3.4;
    an average particle size from about 1 to about 60 micrometers; and
    a protein amino acid content of
        3 to 25 wt % glycine,
        0.5 to 15 wt % hydroxyproline,
        1 to 18 wt % proline,
        0.02 to 4 wt % taurine, and
        0.05 to 3 wt % tryptophan.

2. The turkey collagen hydrolysate composition of claim 1, wherein the protein amino acid content comprises:
    4 to 21 wt % glycine,
    0.5 to 12 wt % hydroxyproline,
    1 to 15 wt % proline,
    0.1 to 2 wt % taurine, and
    0.05 to 3 wt % tryptophan.

3. The turkey collagen hydrolysate composition of claim 1, wherein the protein amino acid content comprises:
    3 to 25 wt % glycine,
    0.1 to 6 wt % histidine,
    0.5 to 15 wt % hydroxyproline,
    0.5 to 7 wt % isoleucine,
    1 to 9 wt % leucine,
    1 to 9 wt % lysine,
    0.5 to 5 wt % methionine,
    0.5 to 5 wt % phenylalanine,
    1 to 18 wt % proline,
    0.05 to 4 wt % taurine,
    0.5 to 6 wt % threonine,
    0.05 to 3 wt % tryptophan, and
    0.5 to 7 wt % valine.

4. The turkey collagen hydrolysate composition of claim 1, wherein the protein amino acid content comprises:
    2 to 11 wt % alanine,
    3 to 12 wt % arginine,
    2 to 10 wt % aspartic acid,
    0.1 to 3 wt % cysteine,
    5 to 14 wt % glutamic acid,
    3 to 25 wt % glycine,
    0.1 to 6 wt % histidine, and
    0.3 to 10 wt % hydroxylysine,
    0.5 to 15 wt % hydroxyproline,
    0.5 to 7 wt % isoleucine,
    1 to 9 wt % leucine,
    1 to 9 wt % lysine,
    0.5 to 5 wt % methionine,
    0.5 to 5 wt % phenylalanine,
    1 to 18 wt % proline,
    0.5 to 6 wt % serine,
    0.2 to 4 wt % taurine,
    0.5 to 6 wt % threonine,
    0.05 to 3 wt % tryptophan,
    0.5 to 6 wt % tyrosine, and
    0.5 to 7 wt % valine.

5. The turkey collagen hydrolysate composition of claim 1, wherein the protein amino acid content comprises:
    11 to 18 wt % glycine,
    4 to 10 wt % hydroxyproline,
    4 to 10 wt % proline,
    0.1 to 1 wt % taurine, and
    0.05 to 3 wt % tryptophan.

6. The turkey collagen hydrolysate composition of claim 1, wherein the protein amino acid content comprises:
    3 to 10 wt % alanine,
    3 to 9 wt % arginine,
    3 to 8 wt % aspartic acid,
    0.1 to 1 wt % cysteine,
    5 to 11 wt % glutamic acid,
    11 to 18 wt % glycine,
    0.1 to 3 wt % histidine, and
    0.1 to 3 wt % hydroxylysine,
    4 to 10 wt % hydroxyproline,
    0.5 to 4 wt % isoleucine,
    1 to 6 wt % leucine,
    1 to 6 wt % lysine,
    0.5 to 4 wt % methionine,
    0.5 to 4 wt % phenylalanine,
    4 to 10 wt % proline,
    1 to 4 wt % serine,
    0.1 to 1 wt % taurine,
    1 to 4 wt % threonine,
    0.05 to 1 wt % tryptophan,
    0.5 to 4 wt % tyrosine, and
    0.5 to 4 wt % valine.

7. The turkey collagen hydrolysate composition of claim 1, wherein the protein amino acid content comprises:
    4 to 17 wt % glycine,
    0.5 to 9 wt % hydroxyproline,
    1 to 11 wt % proline,
    0.05 to 2 wt % taurine, and
    0.05 to 3 wt % tryptophan.

8. The turkey collagen hydrolysate composition of claim 1, wherein the protein amino acid content comprises:
    4 to 17 wt % glycine,
    0.5 to 6 wt % histidine,
    0.5 to 9 wt % hydroxyproline,
    0.5 to 7 wt % isoleucine,
    1 to 9 wt % leucine,
    1 to 9 wt % lysine,
    0.1 to 5 wt % methionine,
    0.5 to 5 wt % phenylalanine,
    1 to 11 wt % proline,
    0.05 to 2 wt % taurine,
    0.5 to 6 wt % threonine,
    0.05 to 3 wt % tryptophan, and
    0.5 to 7 wt % valine.

9. The turkey collagen hydrolysate composition of claim 1, wherein the protein amino acid content comprises:
    2 to 10 wt % alanine,
    3 to 10 wt % arginine,
    2 to 10 wt % aspartic acid,
    0.1 to 2 wt % cysteine,
    5 to 14 wt % glutamic acid,
    4 to 18 wt % glycine,
    0.5 to 6 wt % histidine, and
    0.1 to 3 wt % hydroxylysine,
    0.5 to 9 wt % hydroxyproline,
    0.5 to 7 wt % isoleucine,
    1 to 9 wt % leucine,
    1 to 9 wt % lysine,
    0.1 to 5 wt % methionine, 0.5 to 5 wt % phenylalanine,
1 to 11 wt % proline,
0.5 to 5 wt % serine,
0.05 to 2 wt % taurine,
0.5 to 6 wt % threonine,
0.05 to 3 wt % tryptophan,
0.5 to 6 wt % tyrosine, and
0.5 to 7 wt % valine.

10. The turkey collagen hydrolysate composition of claim 1, wherein the protein amino acid content comprises:
4 to 17 wt % glycine,
0.5 to 9 wt % hydroxyproline,
1 to 11 wt % proline,
0.02 to 2 wt % taurine, and
0.05 to 3 wt % tryptophan.

11. The turkey collagen hydrolysate composition of claim 1, wherein the protein amino acid content comprises:
2 to 10 wt % alanine,
1 to 10 wt % arginine,
1 to 10 wt % aspartic acid,
0.1 to 2 wt % cysteine,
2 to 14 wt % glutamic acid,
4 to 18 wt % glycine,
0.2 to 6 wt % histidine, and
0.1 to 3 wt % hydroxylysine,
0.5 to 9 wt % hydroxyproline,
0.4 to 7 wt % isoleucine,
1 to 9 wt % leucine,
1 to 9 wt % lysine,
0.1 to 5 wt % methionine,
0.5 to 5 wt % phenylalanine,
1 to 11 wt % proline,
0.5 to 5 wt % serine,
0.02 to 2 wt % taurine,
0.5 to 6 wt % threonine,
0.05 to 3 wt % tryptophan,
0.3 to 6 wt % tyrosine, and
0.5 to 7 wt % valine.

12. The turkey collagen hydrolysate composition of claim 1, wherein from about 25% to 60% of the protein in the turkey collagen hydrolysate composition has a molecular weight of from about 500 to about 5000 Daltons.

13. The turkey collagen hydrolysate composition of claim 1, wherein the composition has a fat content of about 1 wt % or less.

14. The turkey collagen hydrolysate composition of claim 1, wherein the composition has an ash content of about 4% or less.

15. The turkey collagen hydrolysate composition of claim 1, wherein the composition comprises type I and type III collagen.

16. The turkey collagen hydrolysate composition of claim 1, wherein the composition comprises type II collagen.

17. The turkey collagen hydrolysate composition of claim 1, wherein the composition has a protein solubility of from about 99% to 100% at a pH selected from the group consisting of pH 7.0, pH 3.4, and pH 5.

18. The turkey collagen hydrolysate composition of claim 1 wherein the turkey collagen hydrolysate composition has a protein concentration of at least about 83 wt %.

19. The turkey collagen hydrolysate composition of claim 1, wherein from about 50 to 80 percent by weight of the particles have an average particle size from about 1 to about 20 micrometers.

20. The turkey collagen hydrolysate composition of claim 1, wherein from about 30 to 50 percent by weight of the particles have an average particle size from about 80 to about 150 micrometers.

* * * * *